(12) United States Patent
Yu et al.

(10) Patent No.: US 9,436,416 B2
(45) Date of Patent: Sep. 6, 2016

(54) MOBILE PRINTER CONTROLLER WITH HIGH FIDELITY PREVIEW AND PRINT JOB MANIPULATION

(71) Applicant: CSR Imaging US, LP, Burlington, MA (US)

(72) Inventors: Shenbo Yu, Andover, MA (US); Majid Moztarebi Farahani, Nashua, NH (US); Luis Enrique Garcia Ugarriza, Bryn Mawr, PA (US); Thomas Robert Mager, Jr., Marblehead, MA (US)

(73) Assignee: CSR Imaging US, LP, Burlington, MA (US)

( * ) Notice: Subject to any disclaimer, the term of this patent is extended or adjusted under 35 U.S.C. 154(b) by 0 days.

(21) Appl. No.: 14/188,560

(22) Filed: Feb. 24, 2014

(65) Prior Publication Data

US 2015/0242168 A1    Aug. 27, 2015

(51) Int. Cl.
*G06F 3/12*       (2006.01)
*G06F 17/21*      (2006.01)

(52) U.S. Cl.
CPC .......... *G06F 3/1224* (2013.01); *G06F 3/1203* (2013.01); *G06F 3/1208* (2013.01); *G06F 3/1237* (2013.01); *G06F 3/1245* (2013.01); *G06F 3/1256* (2013.01); *G06F 3/1287* (2013.01); *G06F 3/1292* (2013.01); *G06F 17/212* (2013.01)

(58) Field of Classification Search
CPC .. G06F 3/1224; G06F 3/1203; G06F 3/1237; G06F 3/1256; G06F 3/1245; G06F 3/1287; G06F 17/212; G06F 3/1208; G06F 3/1292

USPC .......................................... 358/1.15; 14/1.15
See application file for complete search history.

(56) References Cited

U.S. PATENT DOCUMENTS

| | | | |
|---|---|---|---|
| 8,503,030 B2 | 8/2013 | Goldwater et al. | |
| 8,547,583 B2 | 10/2013 | Dolan et al. | |
| 8,553,260 B2 | 10/2013 | Goldwater et al. | |
| 2004/0223175 A1* | 11/2004 | Lee | 358/1.13 |
| 2011/0075166 A1* | 3/2011 | Goldwater et al. | 358/1.9 |
| 2011/0075200 A1* | 3/2011 | Goldwater et al. | 358/1.15 |
| 2013/0194634 A1* | 8/2013 | Sankaranarasimhan et al. | 358/1.15 |
| 2013/0246901 A1* | 9/2013 | Massand | G06F 17/24 715/229 |

* cited by examiner

*Primary Examiner* — Kent Yip
(74) *Attorney, Agent, or Firm* — The Marbury Law Group, PLLC

(57) ABSTRACT

Embodiments are directed to a mobile print controller. A document may be determined to in a print queue. The print queue may be operative on a print server computer, a cloud computing service, a mobile computer, or the like. The mobile controller may send a pause command to a printer device associated with the print queue. The document may be acquired from the print queue for processing on the mobile computer. A preview document may be generated on the mobile computer and displayed and edited on the mobile computer. The edited document may be synced with one or more data stores, including the computer that may have originated the print job. And, the updated document may be sent to the printer for printing. A status report may be communicated to the user that corresponds to a result of printing the updated document.

20 Claims, 16 Drawing Sheets

MOBILE PRINTER CONTROLLER WITH HIGH FIDELITY PREVIEW AND PRINT JOB MANIPULATION

TECHNICAL FIELD

The present invention relates generally to document printing, and more particularly, but not exclusively, to processing documents for printing on a mobile computer.

BACKGROUND

Conventional printer controllers may often be small computers located within the printer device. These small computers may receive documents in the form of print data and then determine how to layout the document on paper for printing. In some cases, the printer controller and a local or remote computer may communicate via a common printer control language or a page description language (PDL) that may describe a document as a set of commands for drawing graphics, text, images, or the like. Commands may also include instructions related to page information, such as margins, fonts, or the like. Today's mobile computers, such as a smart phones, tablets, or the like, continue on a path towards having more and more powerful processors, improved hardware architecture, higher central processing unit (CPU) speeds, more CPU cores, and more bits (e.g., 64 bits) for processing. Accordingly, a typical mobile computer CPU may often be more powerful than a printer controller processor in a typical printer. Network connected printers and multi-function printers can select jobs from multiple sources: job queues, security queues, document management systems, built in disks, digital cameras or removable mass storage devices. The ability to select, examine and manipulate jobs before printing may be desirable. Potential manipulations include form or letterhead overlay/underlay, watermarking, page headers or footers with numbering, serial stamping, color correction/conversion, n-Up, imposition, or the like. Also, previewing the results of these manipulations prior to printing may be desirable. Also, users may generate and/or receive electronic documents in a wide variety of file formats and/or page description languages (PDLs). Further, at any given time, users may be using a variety of computing platforms and/or operating systems. Further, enterprises may include numerous computing platforms and/or operating systems that are part of their information technology infrastructure. Often users may attempt to "preview" their various documents on different computing platforms to see how the document may appear if it is printed. However, since different documents may be comprised of different types of PDL's and previewing these documents may be attempted on many different types of computing platforms, adequate previewing features may be unavailable for a given computing platform and/or for a given PDL. Thus, it is with respect to these and other considerations that the invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
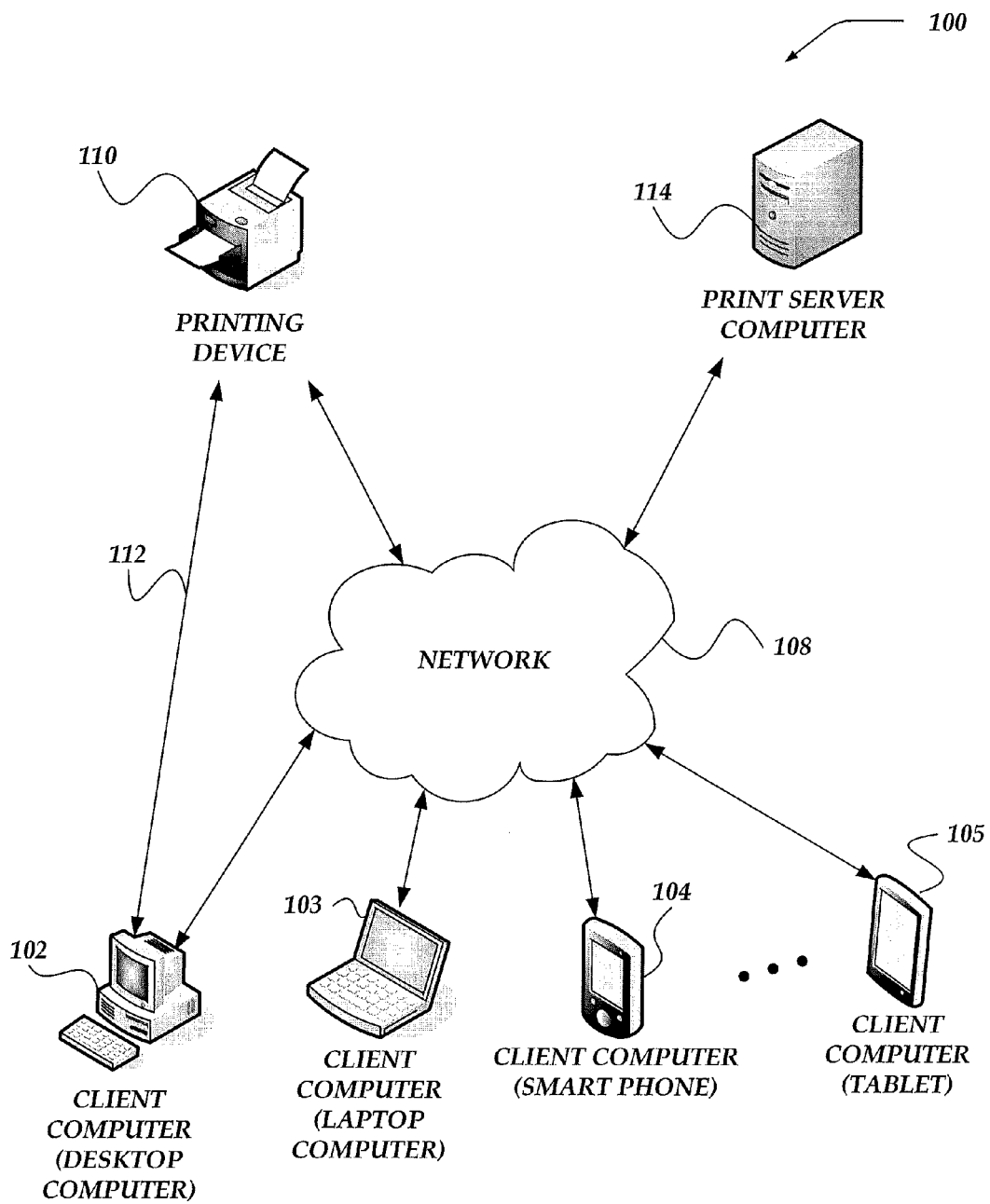
FIG. 1 is a system diagram of an environment in which embodiments of the invention may be implemented.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "document" refers to a file that is in a format suitable for printing. Documents may be editable by a user employing a document-processing application. Examples of document formats may include, but is not limited to word processing formats (e.g., .doc, .docx), spreadsheet or workbook formats (e.g., .xls, .xlsx), presentation formats (e.g., .ppt, .pptx), or the like. In at least one of various embodiments, documents may be different, separate, and/or independent of files in non-user-editable formats, including page description languages (PDL), such as, for example, PostScript, PDF, printer command language (PCL), XPS, OpenXPS, or the like. So, a file may refer to documents and files in a page description language. In some embodiments, documents may include to Microsoft Office documents. So, embodiments described herein may be utilized by a print controller to convert documents to a page representation and image representation before previewing on a computer and/or transmitting to a printer.

As used herein, the term "native file format" refers to a format of a file that is not converted, altered, or otherwise changed into a different format. Once a file is converted from one format to another, such as, for example, converting a .doc file into a PostScript file, then the document may no longer be in its native file format.

As used herein, the term "interpreter" or "interpreter engine" refers to a printer component operative to parse and layout at least one page of a file into a page representation. In some embodiments, an interpreter may convert one or more pages of a document (e.g., in a format such as .doc, .docx, .xls, .xlsx, .ppt, or .pptx) into corresponding page representations. The pages of a document to convert into page representations may be determined based on selection by a user. For example, a user may select to print an entire document, or the user may select to print one or more pages, or the like. In some embodiments, interpreters may also include components enabled to convert page description language files (e.g., PCL, PostScript, PDF, XPS, or the like) into page representations that may be considered intermediate documents.

As used herein, the term "graphics primitives" refers to the simplest (i.e. 'atomic' or irreducible) geometric objects that the system (e.g., printer) can handle (e.g., draw, store, or the like). In various embodiments, graphics primitives may include: points, lines and/or line segments, planes, circles and/or ellipses, triangles and/or other polygons, spline curves, or the like. The combination of a plurality of graphics primitives for a particular page representation may accurately represent the original document's corresponding page's intended graphical/visual representation.

As used herein, the term "feature object" refers to a platform independent data structure that represents the features in the a document, such as, text, basic geometric objects, graphics primitives, layout, document information, font, colors, position information, z-order, transparency, vector information, raster information, localization information, optical character recognition information, or the like.

As used herein, the term "display list" refers to list of feature objects for an intermediate document.

As used herein, the term "platform specific" refers to requirements, features, software modules, hardware modules, application programming interfaces (APIs), services, or the like, that may be specific to a particular computing platform and/or computer operating system.

As used herein, the term "platform independent" refers to requirements, features, software modules, hardware modules, application programming interfaces (APIs), services, or the like, that may be independent of any specific to a particular computing platform and/or computer operating system.

As used herein, the term "intermediate document" refers to a platform independent description of a page that may include display lists and/or feature objects. In some embodiments, the components of the intermediate document may be described as an intermediate page description language.

As used herein, the term "preview document" refers to document information that has been rendered from an intermediate document into a format that is suitable for viewing on a computer, smart phone, tablet computer, laptop computer, desktop computer, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to a mobile print controller that may be operative on a mobile computer for previewing, editing or printing of document. In at least one of the various embodiments, an original document that may be associated with a print job may be determined to in a print queue. In at least one of the various embodiments, the print queue may be operative on a print server computer, a cloud computing service, a mobile computer, or the like. In some cases, in at least one of the various embodiments, a pause command may be communicated to a printer device that may be associated with the print queue.

In at least one of the various embodiments, a copy of the original document, or in some case, the original document itself, may be acquired from the print queue for processing on the mobile computer. In at least one of the various embodiments, a preview document may be generated on the mobile computer such that the preview document may be based on the original document (or its copy) and the preview document may be displayed on the mobile computer.

In at least one of the various embodiments, the mobile computer may enable a user to provide edit information using a user-interface on the mobile computer. Accordingly, in at least one of the various embodiments, an updated document may be generated on the mobile computer based on the edit information and the copy of the original document. The preview document may be regenerated on the mobile computer based on the updated document.

In at least one of the various embodiments, a copy of the updated document may be communicated from the mobile computer to at least one data store. This may at least enable the updated document to be synced with one or more data stores, including the computer that may have originated the print job.

In at least one of the various embodiments, a mobile computer may be arranged to enable the updated document to be communicated the printer device for printing. In at least one of the various embodiments, enabling the updated document to be communicated the printer device for printing, may include, providing the updated document to the print queue, and communicating a restart command that enables the printer device to print the updated document.

Also, in at least one of the various embodiments, enabling the updated document to be communicated to the printer device for printing, may include sending the updated document directly from the mobile computer to the print queue, the printer device, or the like. In at least one of the various embodiments, a status report that corresponds to the result of printing the updated document may be generated and communicated to the user.

Illustrative Operating Environment

FIG. 1 shows components of one embodiment of an environment in which various embodiments of the invention may be practiced. Not all of the components may be required to practice the various embodiments, and variations in the arrangement and type of the components may be made without departing from the spirit or scope of the invention. As shown, system 100 of FIG. 1 may include printing device 110, client computers 102-105, printer server computer 114, and network 108.

At least one embodiment of client computers 102-105 is described in more detail below in conjunction with computer 200 of FIG. 2. Briefly, in some embodiments, client computers 102-105 may be configured to communicate with printing device 110 and/or print server computer 114. In various embodiments, client computers 102-105 may include print controllers for processing documents before they are provided to a printing device, such as, printing device 110 and/or print server computer 114.

In some embodiments, at least some of client computers 102-105 may operate over a wired and/or wireless network to communicate with other computing devices or printing device 110. Generally, client computers 102-105 may include computing devices capable of communicating over a network to send and/or receive information, perform various online and/or offline activities, or the like. It should be recognized that embodiments described herein are not constrained by the number or type of client computers employed, and more or fewer client computers—and/or types of client computers—than what is illustrated in FIG. 1 may be employed.

Devices that may operate as client computers 102-105 may include various computing devices that typically connect to a network or other computing device using a wired and/or wireless communications medium. Client computers may include portable and/or non-portable computers.

In some embodiments, client computers may include client computers, server computers, or the like. Examples of client computers 102-105 may include, but are not limited to, desktop computers (e.g., client computer 102), personal computers, multiprocessor systems, microprocessor-based or programmable electronic devices, network PCs, laptop computers (e.g., client computer 103), smart phones (e.g., client computer 104), tablet computers (e.g., client computer 105), cellular telephones, display pagers, radio frequency (RF) devices, infrared (IR) devices, Personal Digital Assistants (PDAs), handheld computers, wearable computing devices, entertainment/home media systems (e.g., televisions, gaming consoles, audio equipment, or the like), household devices (e.g., thermostats, refrigerators, home security systems, or the like), multimedia navigation systems, automotive communications and entertainment systems, integrated devices combining functionality of one or more of the preceding devices, or the like. As such, client computers 102-105 may include computers with a wide range of capabilities and features.

Client computers 102-105 may access and/or employ various computing applications to enable users of client computers to perform various online and/or offline activities. Such activities may include, but are not limited to, generating documents, gathering/monitoring data, capturing/manipulating images, managing media, managing financial information, playing games, managing personal information, browsing the Internet, or the like. In some embodiments, client computers 102-105 may be enabled to connect to a network through a browser, or other web-based application.

Client computers 102-105 may further be configured to provide information that identifies the client computer. Such identifying information may include, but is not limited to, a type, capability, configuration, name, or the like, of the client computer. In at least one embodiment, a client computer may uniquely identify itself through any of a variety of mechanisms, such as an Internet Protocol (IP) address, phone number, Mobile Identification Number (MIN), media access control (MAC) address, electronic serial number (ESN), or other device identifier.

At least one embodiment of printing device 110 is described in more detail below in conjunction with printing device 400 of FIG. 4. Briefly, in some embodiments, printing device 110 may be a printer operative to print documents and other files. In some embodiments, printing device 110 may be configured to communicate with one or more of client computers 102-105 to receive at least a portion of a document selected to be printed, as described herein. Examples of printing device 110 may include, but is not limited to, laser printers, LED printers (or other toner-based printing technologies), liquid inkjet printers, solid ink printers, dye-sublimation printers, inkless printers such as thermal printers and UV printers, dot-matrix printers, ink-based plotters, or the like.

Client computers 102-105 may communicate with printing device 110 via wired technology 112 and/or network 108. In various embodiments, wired technology 112 may include a USB cable, printer cable, or the like for connecting to client computers 102-105.

Network 108 may include virtually any wired and/or wireless technology for communicating with a remote device, such as, but not limited to Bluetooth, Wi-Fi, or the like. In some embodiments, network 108 may be a network configured to couple network computers with other computing devices, including client computers 102-105, printing device 110, or the like. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or any combination thereof. In various embodiments, the network may be enabled to employ various forms of communication technology, topology, computer-readable media, or the like, for communicating information from one electronic device to another. For example, the network can include—in addition to the Internet—LANs, WANs, Personal Area Networks (PANs), Campus Area Networks (CANs), Metropolitan Area Networks (MANs), direct communication connections (such as through a universal serial bus (USB) port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, client computers and/or other related electronic devices could be connected to a network via a modem and temporary telephone link. In essence, the network may include any communication technology by which information may travel between computing devices.

The network may, in some embodiments, include various wireless networks, which may be configured to couple various portable network devices, client computers, wired networks, other wireless networks, or the like. Wireless networks may include any of a variety of sub-networks that may further overlay stand-alone ad-hoc networks, or the like, to provide an infrastructure-oriented connection for at least client computers 103-105. Such sub-networks may include mesh networks, Wireless LAN (WLAN) networks, cellular networks, or the like. In at least one of the various embodiments, the system may include more than one wireless network.

The network may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), or any of a variety of other communication protocols and/or technologies. In essence, the network may include communication technologies by which information may travel between client computers 102-105, printing device 110, print server computer 114, other computing devices not illustrated, other networks, or the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self organize based on current operating conditions and/or rule-based policies, such that the network topology of the network may be modified.

Print server computer 114 may be a network computer capable of forwarding documents to printing device 110. In some embodiments, a client computer (e.g., client computer 102-105) may send and/or otherwise transfer a document (or other file) to print server computer 114, such as via network 108. Print server computer 114 may be enabled to forward and/or otherwise transfer the document to printing device 110, such as via network 108 or a physical connection (not illustrated).

Computers that may be arranged to operate as print server computer 114 include various network computers, including, but not limited to personal computers, desktop computers, multiprocessor systems, microprocessor-based or programmable consumer electronics, network PCs, server computers/devices, network appliances, or the like.

Although FIG. 1 illustrates print server computer 114 as a single computing device, embodiments are not so limited. Rather, one or more functions of print server computer 114 may be distributed across one or more distinct network computers. Moreover, print server computer 114 is not limited to a particular configuration. For example, in one embodiment, print server computer 114 may contain a plurality of network computers. In another embodiment, print server computer 114 may contain a plurality of network computers that operate using a principal/agent (or primary/secondary) approach, where one of the plurality of network computers operates to manage and/or otherwise coordinate operations of the other network computers. In other embodiments, print server computer 114 may operate as a plurality of network computers arranged using one or more architectures, including cluster architectures, peer-to-peer architectures, cloud-based architectures, or the like. Thus, embodiments may be implemented in a variety of architectures and/or configurations, and are not limited to a single environment. It should also be recognized that, although FIG. 1 illustrates a single print server computer, embodiments are not so limited, but rather, in some embodiments, a plurality of different print server computers may be employed.

Illustrative Client Computer

Figure 2:
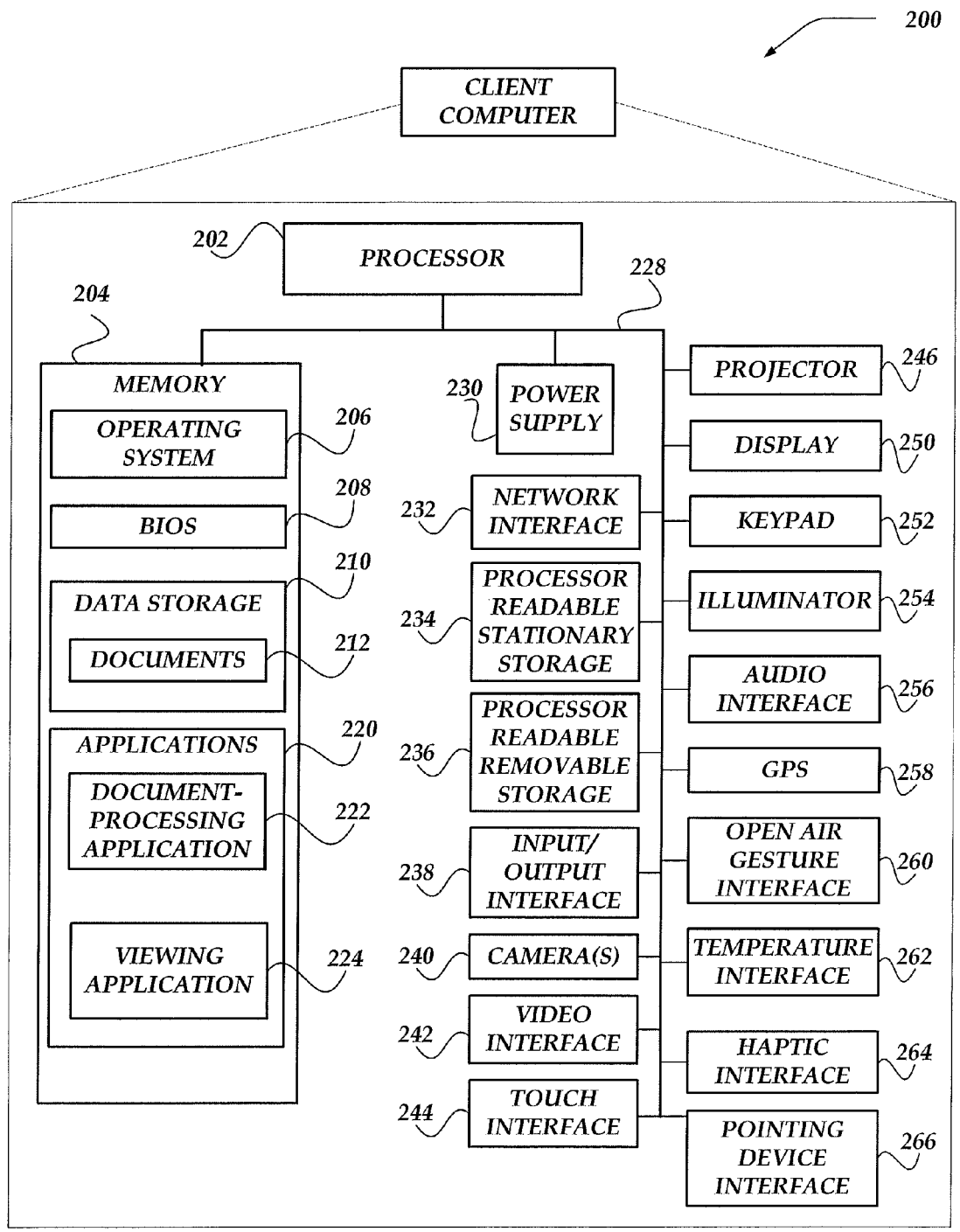
FIG. 2 shows an embodiment of a client computer that may be included in a system such as that shown in FIG. 1.

FIG. 2 shows one embodiment of client computer 200 that may include many more or less components than those shown. Client computer 200 may represent, for example, at least one embodiment of client computers 102-105 shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the mobile computer is powered. Also, illuminator 254 may backlight these buttons in various patterns when particular actions are performed, such as dialing another mobile computer. Illuminator 254 may also cause light sources positioned within a transparent or translucent case of the mobile computer to illuminate in response to actions.

Client computer 200 may also comprise input/output interface 238 for communicating with external peripheral devices or other computers such as other mobile computers and network computers. Input/output interface 238 may enable client computer 200 to communicate with one or more printers, such as printing device 110 of FIG. 1. Other peripheral devices that client computer 200 may communicate with may include remote speakers and/or microphones, headphones, display screen glasses, or the like. Input/output interface 238 can utilize one or more technologies, such as Universal Serial Bus (USB), Infrared, WiFi, WiMax, Bluetooth™, wired technologies, or the like.

Haptic interface 264 may be arranged to provide tactile feedback to a user of a mobile computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the mobile computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A client computer may include a browser application that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the mobile computer.

Data storage 210 may store documents 212 or other data files. Documents 212 may include one or more documents that may be editable by a user by employing document-processing application 222, viewing application 224, or the like. In some embodiments, document-processing application 222 or another application (e.g., a web browser) may be utilized to forward, send, and/or otherwise transfer a document (or other file) to another computing device, such as print server computer 114 of FIG. 1. In at least one such embodiment, the document may be transferred to the other computing device in its native file format (i.e., without first converting the documenting into another file format, such as an intermediate page description language).

Applications 220 may include computer executable instructions which, when executed by client computer 200, transmit, receive, and/or otherwise process instructions and data. Examples of application programs include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Further, Applications 220 may include document processing application 222, viewing application 224, or the like.

Illustrative Network Computer

Figure 3:
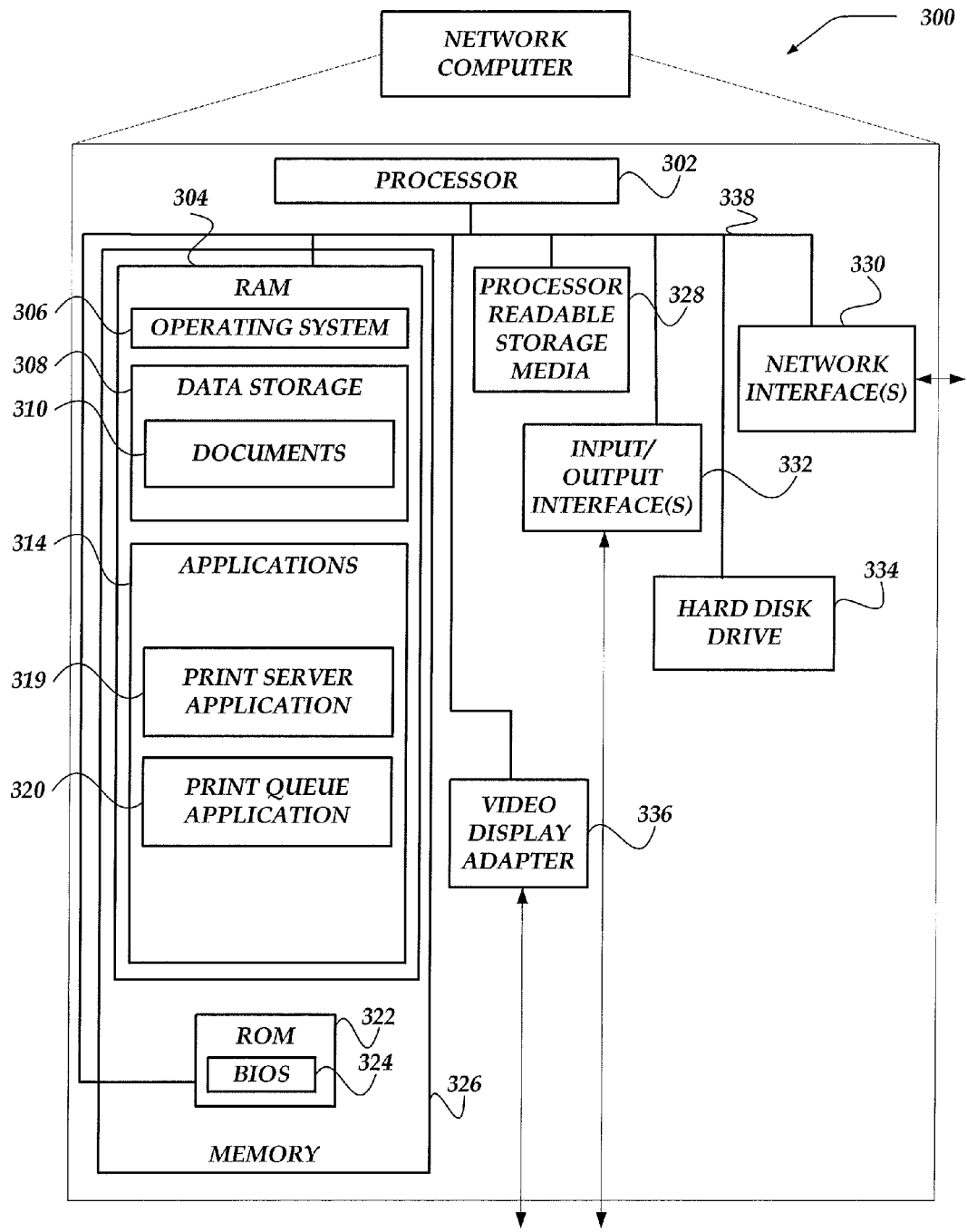
FIG. 3 shows an embodiment of a network computer that may be included in a system such as that shown in FIG. 1.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, or any other device. Network computer 300 may represent, for example print server computer 114 of FIG. 1, and/or other network devices.

Network computer 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, printer (e.g., printing device 110 of FIG. 1) or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another device based on any of a variety of events, including being sent as part of a header during a communication, sent upon request, or the like. Data storage 308 may also be employed to store documents 310. Documents 310 may include one or more documents that may be printed.

Data storage 308 may also include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include print server application 319 and print queue application 320.

Print server computer 319 may be configured to receive a document from a client computer, such as client computers 102-105 of FIG. 1. In some embodiments, printer server application 319 may be employed by print server computer 114 of FIG. 1. In any event, print server application 319 may be employed to forward documents to a printer, such as printing device 110 of FIG. 1, via a physical connection (e.g., a USB cable) or a network connection (e.g., through network 108 of FIG. 1) without converting the document to an intermediate page description language. Also, in at least one of the various embodiments, print queue 320 may be arranged for receiving documents for print jobs and queuing them until they are printed.

Illustrative Imaging Device

Figure 4:
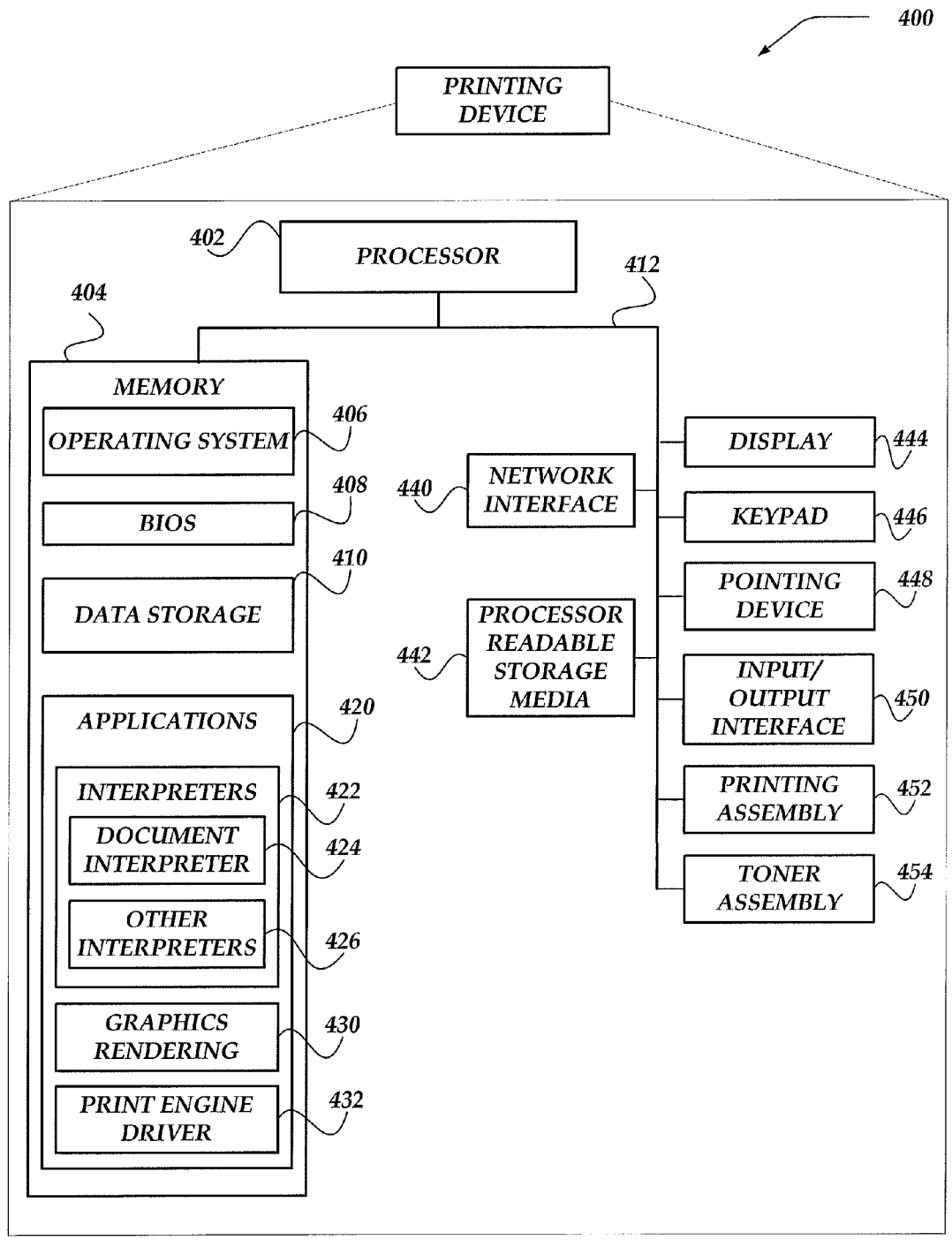
FIG. 4 shows an embodiment of a printing device that may be included in a system such as that shown in FIG. 1.

FIG. 4 shows one embodiment of printing device 400 that may be included in a system implementing the invention. Printing device 400 may include many more or less components than those shown in FIG. 4. However, the components shown are sufficient to disclose an illustrative embodiment for practicing the present invention. Printing device 400 may represent, for example, printing device 110 of FIG. 1. In various embodiments, printing device 400 may be employed to perform various embodiments described herein, including processes or parts of processes 600 and 700 of FIGS. 6 and 7, respectively.

In some embodiments, printing device 400 may be configured to print an image utilizing various printing technologies, including, but not limited to laser printers, LED printers (or other toner-based printing technologies), liquid inkjet printers, solid ink printers, dye-sublimation printers, inkless printers such as thermal printers and UV printers, dot-matrix printers, ink-based plotters, or the like. In some embodiments, printing device 400 may represent a multi-function printer (MFP).

As shown, printing device 400 may include processor 402, one or more network interfaces 440, processor readable storage media 442, display 444, keyboard and/or keypad 446, pointing device 448, input/output interface 450, printing assembly 452, toner assembly 454, and memory 404, all in communication with each other via bus 412.

Printing device 400 may communicate with a client computer, such as client computer 200 of FIG. 2 or network computer 300 of FIG. 3, the Internet, or some other communications network, via network interface(s) 440. Network interface 440 may enable various communication protocols including but not limited to TCP/IP, Wi-Fi, Bluetooth, or the like. Communications may also be over a universal serial port (USB); a parallel port; a serial bus such as RS-232 (Recommended Standard 232), ANSI/TIA/EIA-422, or the like; IEEE 1394 (e.g., Firewire); or the like. Network interface unit(s) 440 is sometimes known as a transceiver, transceiving device, or network interface card (NIC).

Display 444 may include virtually any type of display, monitor, terminal, screen and the like that displays text, graphics, images, and/or any other type of data to a user. Types of displays may include, but are not limited to, a liquid crystal display (LCD), gas plasma, light emitting diode (LED), cathode ray tube (CRT), or the like. Display 444 may also interface with keyboard/keypad 446 and/or pointing device 448 to receive and/or display user input. Additionally, or alternatively, printing device 400 may communicate with one or more display devices that are external to the printer, to display information regarding print jobs.

Keyboard/keypad 446 may comprise any input device arranged to receive input from a user. For example, keyboard/keypad 446 may include a push button numeric dial, keyboard, touch screen, or the like. Keyboard/keypad 446 may include alphabetic inputs, numeric inputs, and/or other character inputs, and may further include function and/or command buttons associated with functionality for selecting, examining, editing, and/or printing documents. User inputs made via keyboard/keypad 446 may be shown in display 444.

Pointing device 448 may include virtually any device that enables a user to input spatial and/or positional data to printing device 400. Pointing device 448 may include devices based on the user touching a surface, such as a touchpad, touchscreen, graphics tablet, joystick or pointing stick, either with a body part (e.g. finger or hand) or with an object such as a wand, stylus, pen, lightpen and the like. Pointing device 448 may further include devices based on the user moving an object, such as a mouse, trackball, joystick, and the like. User inputs made via pointing device 448 may be shown in display 444.

Input/output interface 450 may include various means for communicating with external devices, such as external displays, user input devices, computer devices, networking devices, and the like. Input/output interface 450 may employ one or more communications technologies including but not limited to USB, Bluetooth, serial port (e.g. RS-232 standard), parallel port (e.g. IEEE 1284 standard), and the like. In some embodiments, a USB driver or other portable storage device may communicated with printing device 400 through input/output interface 450 and be utilized to provide a document to printing device 400.

Memory 404 may include RAM, ROM, and/or other types of memory. Memory 404 illustrates an example of computer-readable storage media (devices) for storage of information such as computer-readable instructions, data structures, program modules or other data. Memory 404 may store BIOS 408 for controlling low-level operation of printing device 400. The memory may also store operating system 406 for controlling the operation of printing device 400. It will be appreciated that this component may include a general-purpose operating system such as a version of UNIX, or LINUX™, or a specialized operating system designed and created to support the functionality of printing device 400. The operating system may include or interface with a virtual machine module such as the Java virtual machine or Microsoft .NET runtime that may enable control of hardware components and/or operating system functions via applications that run under such virtual machine modules.

Although illustrated separately, memory 404 may include processor readable storage media 442. Processor readable storage media 442 may be referred to and/or include computer readable media, computer readable storage media, and/or processor readable storage device. Processor readable storage media 442 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 404 further includes one or more data storage 410, which can be utilized by printing device 400 to store, among other things, applications 420 and/or other data. For example, data storage 410 may also be employed to store information that describes various capabilities of printing device 400. The information may then be provided to another device based on any of a variety of events, including being sent as part of a header during a communication, sent upon request, or the like.

Data storage 410 may also store program code, instructions, and/or data. For example data storage 410 may be configured to store imaging commands, diagnostics, user preferences, imaging control software, information regarding the capabilities of the printing device such as supported color palettes, fonts, pagination, page size, and the like. Data storage 410 may further store documents to be printed (e.g., queuing multiple print jobs), intermediate files (e.g., page representations and/or image representations), or the like, as well as any other information needed for selecting, examining, editing, modifying, displaying, and/or printing a document or file.

Applications 420 may include computer executable instructions, which may be loaded into mass memory and run on operating system 406. Applications 420 may include interpreters 422, graphics rendering engine 430, and print engine driver 432. Interpreters 422 may include document interpreter engine 424 and other interpreter engines 426. Document interpreter engine 424 may be configured to determine page representations of each requested page of a document to be printed. In various embodiments, document interpreter engine 424 may convert one or more pages from documents in formats, such as .doc, .docx, .xls, .xlsx, .ppt, or .pptx, into separate page representations that each includes a plurality of graphics primitives. Other interpreter engines 426 may include engines configured to convert files in a page description language into page representations. Graphics rendering engine 430 may be configured to determine image representations of each page representation. And print engine may be configured to communicate with other printing hardware and/or software (e.g., printing assembly 452) to facilitate printing of the determined image representations.

As stated herein, printing device 400 may incorporate various types of printing technologies without departing from the scope of the invention. In some embodiments, printing device 400 may be configured to employ laser printing technology. The following is an example, non-limiting description of laser printing technology that may be employed to implement embodiments of the invention. In such embodiments, printing assembly 452 may include such elements as are necessary for laser printing, such as a drum assembly, corona wire, fuser, discharge lamp, laser scanning unit, and/or photoreceptor. In some embodiments, drum assembly may be configured to revolve, and may be made of any of a variety of photoconductive materials. The drum assembly may be given an electric charge by the corona wire (or in some embodiments by a charged roller). As the drum assembly rotates, a laser scanning unit may direct a laser beam across the drum assembly's surface based on the data to be printed. A toner assembly 454 may provide toner, such as in a powder form, onto the drum assembly. A corona wire may further provide a charge to paper or other print material, which may then be moved over the drum assembly. The paper or other print material may then pass through a fuser such that the applied toner is heated or otherwise caused to adhere to the paper or other print material. Upon depositing toner to the paper or other print material, the surface of the drum of the drum assembly may pass a discharge lamp where a light, or the like, may expose the drum to erase or remove the electrical image. In one embodiment, the drum surface of the drum assembly may then pass the corona wire, which may then reapply a charge. It should be noted that embodiments of the invention are not limited to this method of transferring data onto a print material, and other mechanisms may also be used. Thus, the invention is not to be constrained or otherwise narrowed by this embodiment.

In various embodiments, printing assembly 452 and/or toner assembly 454 may communicate with print engine driver 432 to facilitate printing of documents and other files and/or images. Print engine driver 432 may be responsible for numerous actions associated with the physical printing of the document, including, but not limited to, setting up the print engine to print a page, requesting paper to be fed through the printer, passing the application generated raster data (e.g., image representation) to the print engine, monitoring for completion of the print job, monitoring for errors, or the like. Print engine driver 432 may select a paper size, media type, input tray, output bin, other finishing options or print engine parameters, or the like. In various embodiments, print engine driver 432 and/or the physical print engine may be capable of handling one or more pages in parallel.

Illustrative Logical Embodiments

Figure 5:
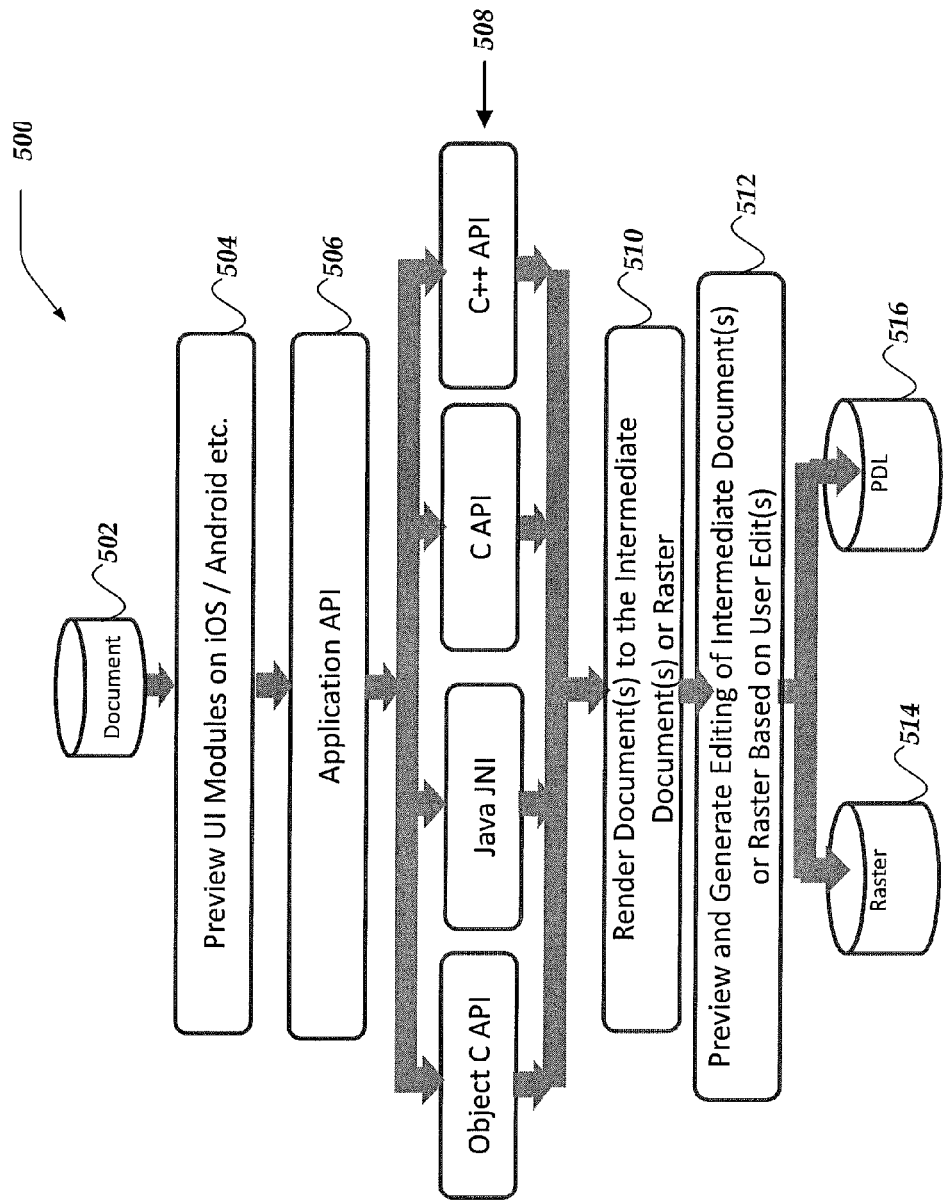
FIG. 5 illustrates a logical block diagram of a system that may be employed for printings.

FIG. 5 illustrates a logical block diagram of system 500 that may be employed for printings in accordance with at least one of the various embodiments. In at least one of the various embodiments, system 500 may be comprised of applications, modules, components, libraries, or the like, such as document processing application 222, viewing application 224, or the like. Also, in at least one of the various embodiments, system 500 may be comprised of software modules, hardware processors, custom field programmable gate arrays (FPGAs), application specific integrated circuits (ASICS), or the like, or combination thereof.

In at least one of the various embodiments, system 500 may be arranged to process on or more documents, such as document 502. Document 502 may be provided to one or more print preview applications/operating system modules that may be available on a client computer, such as, client computer 200. For example, in at least one of the various embodiments, a user may select a documents that is accessible from the client computer and "send" it to a print preview service offered on the client computer. In at least one of the various embodiments, the document may be resident and/or stored locally on the client computer (e.g., documents data store 212) or the document may be located remotely one a remote server computer and/or in a cloud environment.

In at least one of the various embodiments, preview modules 502 may be arranged to employ a document service application API, such as, application API 506. In at least one of the various embodiments, application API 506 may be arranged to include one or more interfaces for exchanging information that may include document data, print processing commands, configuration information, or the like, to the other modules in system 500.

In at least one of the various embodiments, native modules 508 may include computing platform and/or operating system specific implementations for the interfaces that may be provided by application API 506. In at least one of the various embodiments, these modules may be arranged to provide access to one or more services and/or features of a given computing platform. For example, an interface method for retrieving document information from an email attachment may require different implementations depending on the computing platform. Accordingly, in at least one of the various embodiments, even if the methods supported by Application API 504 may be consistent across various computing platforms, the underlying implementation provided by native modules 508 may vary significantly. In at least one of the various embodiments, PDL interpreter APIs written in different languages, such as Object C for iOS or Mac OSX, Java for Android, C++ for Window Mobile, C for Linux, or the like, may be include in native module 508.

In at least one of the various embodiments, computing platform specific versions system 500 may be generated and installed on a given computing platform. Accordingly, in at least one of the various embodiments, native modules 508 may be arranged to include just the modules required for compatibility with the computer platform where it may be resident.

In at least one of the various embodiments, render module 510 may be provided document information that may include document data, print processing commands, configuration information, or the like. However, in at least one of the various embodiments, the form and/or format of the information may be normalized so its form and format may be independent of the underlying computing platform. This normalization process may be enabled by the computing platform specific arrangement comprising native modules 508.

In at least one of the various embodiments, render module 510 may be arranged generate an intermediate document from document information provided by native modules 508. In at least one of the various embodiments, the document information provided to render module 510 may include information formatted using one or more well-known page definition languages (PDLs), such as, PDF, Postscript, XPS, PCL, or the like. In at least one of the various embodiments, render module 510 may be arranged to parse the various features of the document that may be represented using PDL language constructs and/or objects.

In at least one of the various embodiments, render module 510 may generate an intermediate document based on the features that may be parsed out of the PDL used for the original document. In at least one of the various embodiments, the intermediate document be arranged to represent all of the features that may be available for one or more PDLs. Accordingly, in at least one of the various embodiments, the intermediate document is represented using an intermediate PDL such the features of the original document are translate from the original PDL to the intermediate PDL.

In at least one of the various embodiments, preview module 512 may be arranged to generate a "print" preview for intermediate documents. Accordingly, since preview module 512 may be arranged to process intermediate document comprised of the intermediate PDL it does not need to include specialized processing and/or understanding of the different PDLs that original documents may be using. Further, in at least one of the various embodiments, preview module 512 may be arranged to generate a document comprising one or more "well-known" PDLs from the intermediate document that is comprised of the intermediate PDL. Likewise, in at least one of the various embodiments, preview module 512 may generate a raster and/or bitmap version of the intermediate documents.

In at least one of the various embodiments, the document generated based on the rasterization or the PDL translation from intermediate document may be output as raster document 514 and/or PDL document 516 and subsequently stored and/or provided to a previewing device or a printer.

In at least one of the various embodiments, block 510 and 512 may be a core library that may be arranged to employ methods and operations for processing documents independent of the characteristics a given computing platform.

Figure 6:
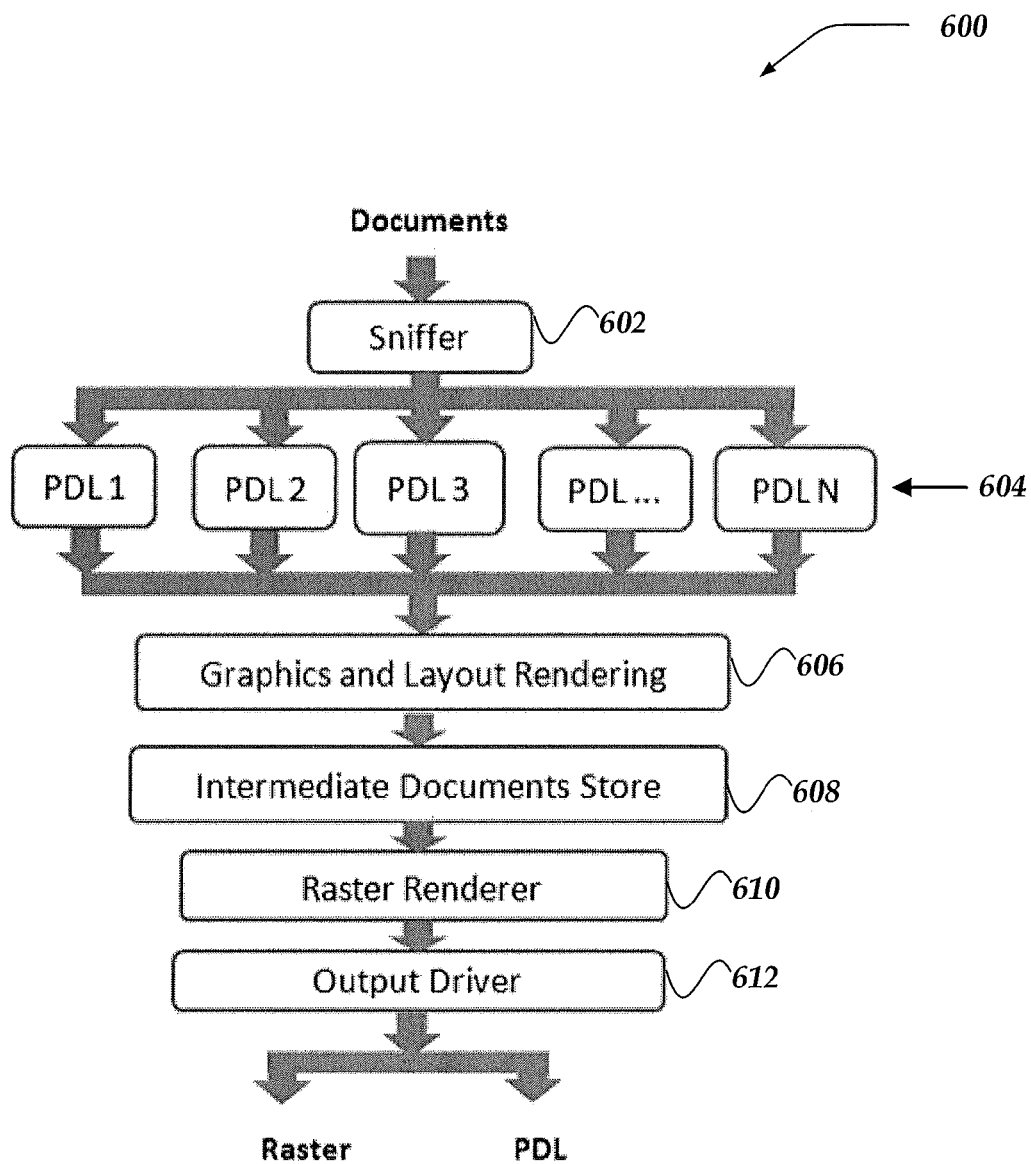
FIG. 6 shows a logical block diagram of a system for rendering a original document for printing or previewing in accordance with at least one of the various embodiments.

FIG. 6 shows a logical block diagram of system 600 for rendering a original document for printing or previewing in accordance with at least one of the various embodiments. In at least one of the various embodiments, system 600 may represent a platform independent engine that may include one or more processes that may comprise render module 510 as shown in FIG. 500. In at least one of the various embodiments, system 600 may include sniffer 602 that may be arranged to identify the type of PDL that is used for an incoming document. In at least one of the various embodiments, the incoming document, also herein described as the original document, may be received as an input stream comprised of data in a well-known PDL format.

In at least one of the various embodiments, well-known PDL's may include readily identified properties, such as, name and version information, that may be extracted from the original document. For example, PDF files often have a marker such as "%PDF-1.6" that can be used by sniffer 602 for determining that the document is a made using the PDF PDL.

In at least one of the various embodiments, system 600 may be arranged to include one or more modules for configuring a parser to parse documents created for different types of PDLs, such as, parse modules 604. Accordingly, in at least one of the various embodiments, graphic and rendering module 606 may use a combination of common modules and PDL specific modules for identifying the features and content included in the original document and mapping and/or translation them from the originating PDL to the intermediate PDL for generating an intermediate document. In at least one of the various embodiments, after the interpreting, the input data is parsed and then translated a set of PDL independent high level graphic objects, which may be described using a set of layout information with a set of coordinates and color palette associated with the source of documents, by the graphics and layout rendering module 606.

Accordingly, in at least one of the various embodiments, high level graphic objects representing using the intermediate PDL may be repurposed for rendering modifications based on user specific editing. The intermediate documents may comprise one or more display lists that include the high level graphic objects that represent the features of the original document.

In at least one of the various embodiments, intermediate document store 608 may be arranged to be a buffer for storing the intermediate document during processing. Also, in at least one of the various embodiments, intermediate documents may be stored for later use. Accordingly, in at least one of the various embodiments, intermediate document store 608 may be a local or remote data store, including, one such as, documents data store 212 on client computer 200, document data store 310 on network computer 300, cloud based storage, or the like.

In at least one of the various embodiments, raster renderer 610 may be arranged to render a raster version of the document from the intermediate document. The layout and content information represented by the intermediate PDL included in the intermediate document may be used for generating one or more raster versions of the document. For example, raster renderer 610 may be arranged to generate a bitmap image from an intermediate document.

In at least one of the various embodiments, output driver 612 may be arranged to translate the raster version of the intermediate document into another PDL or it may be arrange to generate an image suitable for previewing on the client computer.

Figure 7:
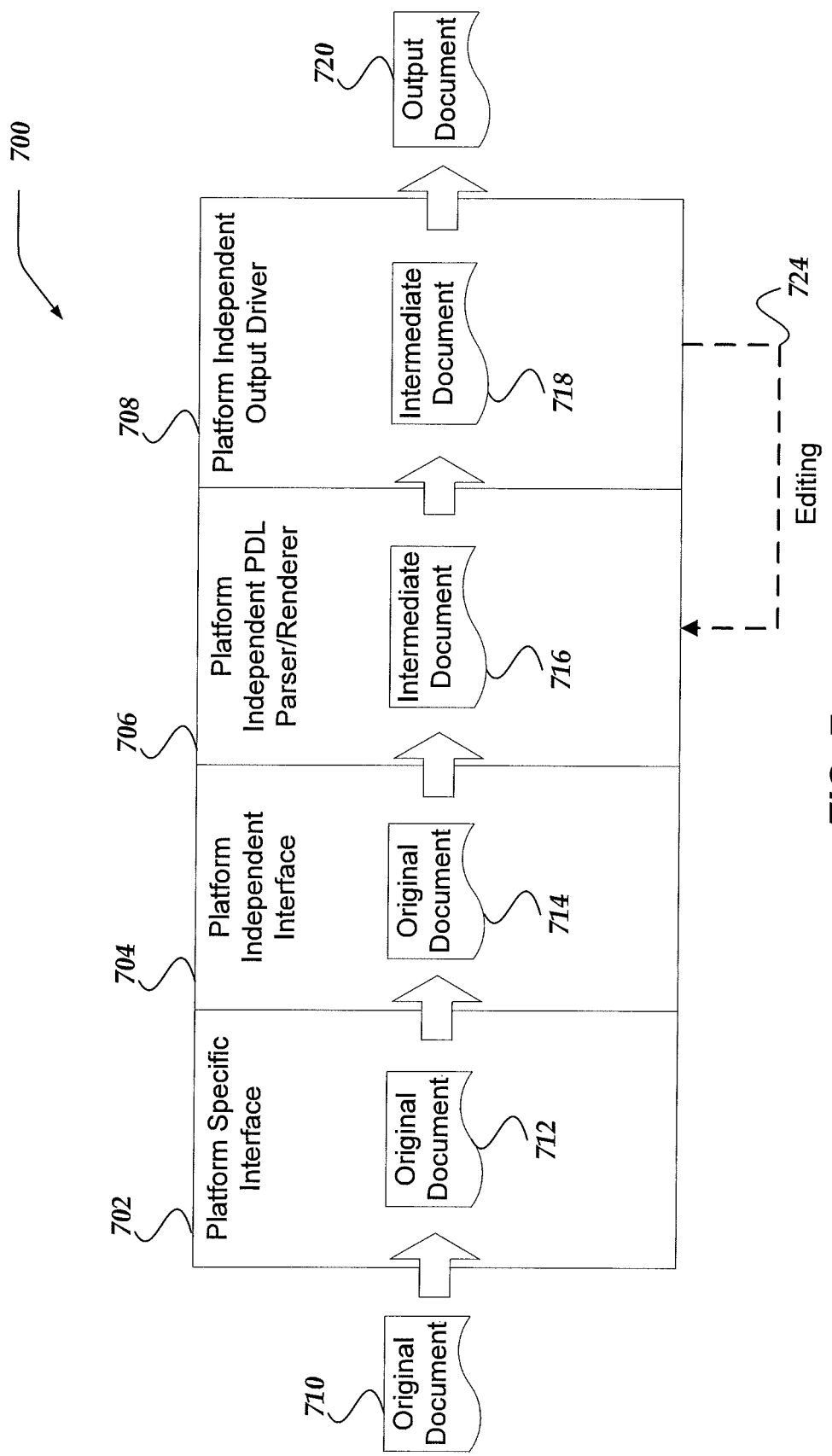
FIG. 7 shows a logical architecture for a viewer for managing the viewing, editing, or printing of documents in accordance with at least one of the various embodiments.

FIG. 7 shows a logical architecture for viewer 700 for managing the viewing, editing, or printing of documents in accordance with at least one of the various embodiments. In at least one of the various embodiments, viewer 700 may include one or more layers, such as, platform specific interface 702, platform independent interface 704, platform independent PDL parser/renderer 706 and platform independent output driver. In at least one of the various embodiments, one or more portions of viewer 700 may be implemented by document processing application 222, viewing application 224, or the like, or combination thereof. Further, in at least one of the various embodiments, platform independent interface 704, platform independent PDL parser/renderer 706 and platform independent output driver, may be arranged as a platform independent engine for processing documents.

In at least one of the various embodiments, document 710 represents a document in its original PDL format, such as, a PDF document. In at least one of the various embodiments, an application operating on the client computer may provide the document (or a copy of the document) to interface 702, represented here by document 712.

In at least one of the various embodiments, at this point in the process, document 712 is still in the original format (same as document 710). Also, it has been open, loaded, copied, or the like, using operations and code interfaces that are native (or compliant) with the local computing platform. Next, in at least one of the various embodiments, the document, represented here by document 716 provided to platform independent interface 704. In at least one of the various embodiments, platform independent interface 704 may be arranged to act as a façade that hides or obscures the implementation differences between different computing platforms. Accordingly, in at least one of the various embodiments, no matter what type of computing platform is operative, the data structure that is used to implement document 714 may remain that consistent across the different computing platforms. Next, in at least one of the various embodiments, the document may be provided to platform independent PDL parser/renderer 706 and converted into an intermediate document, represented by intermediate document 716.

Next, in at least one of the various embodiments, platform independent output driver 708 may take the document, represented by intermediate document 718 and generate one or more output documents, such as, output document 720. In at least one of the various embodiments, output document 720 may be a raster image, such as, a bitmap, TIFF file, JPEG file, or the like, that faithfully representing the content and features of the original document, document 710 for use in a print preview operation. Also, in at least one of the various embodiments, output document 720 may be rendered into a PDL such as, PDF, PCL, XPS, or the like, and passed to a printer or a PDL viewer, such as, PDF reader.

In at least one of the various embodiments, viewer 700 may be arranged to enable a user and/or another process to edit 724 a document after it has been previewed. Accordingly, in at least one of the various embodiments, a user may be enabled to edit the document using viewer 700 directly from a print preview interface. In at least one of the various embodiments, such editing may include adding, modifying, or removing information to document before it is printed. For example, in at least one of the various embodiments, editing may include enabling a user to select particular pages or page ranges for printing. In other cases, editing may include adding bates stamping information or page numbers to a document before printing. Still other editing options may include, adding comments, adding annotations, redacting portions of the document, inserting page headers or page footers to the document, changing colors, changing fonts, adding watermarks, or the like, or combination thereof. Accordingly, depending on the edit, the document may require rendering to generate an update representing for viewing or previewing the document.

In at least one of the various embodiments, editing information representing the changes made by the user may be added to the intermediate document rather than being added to the original document. In at least one of the various embodiments, the particular data structures employed to associate the editing information with the intermediate document may vary depending on several factors. These factors may include, the type of PDL that comprised the original document, specific features of the current document, the types of edit information that may be being added to the document.

In at least one of the various embodiments, the PDL that the original document is comprised of may dictate the type of document features that were available and/or captured for conversion into the intermediate document. In at least one of the various embodiments, if the PDL used in the original document includes identifiable structured information fields, those fields and associated data may be faithfully mapped into the intermediate document using the intermediate PDL. Accordingly, editing may be enabled for those features that were present in the original document if they are identifiable from parsing the PDL comprising the original document. For example, if the original document PDL includes margin information described in a field or other identifiable data structure, viewer 700 may be arranged to enable direct editing of the margins in the intermediate document. In other cases, if the original document is an opaque bitmap, such as, a electrostatic scanned document or digital photograph there may be little structured data associated with the content of the document. Thus, in such cases, there may be few editable features of the intermediate document.

Or, in at least one of the various embodiments, in some cases, such as, adding a watermarks or bates stamps the original content and/or format of the document may be preserved by generating one or more overlays objects that may be composited onto/into the preview document and/or output document at the time of rendering.

Generalized Operations

Figure 8:
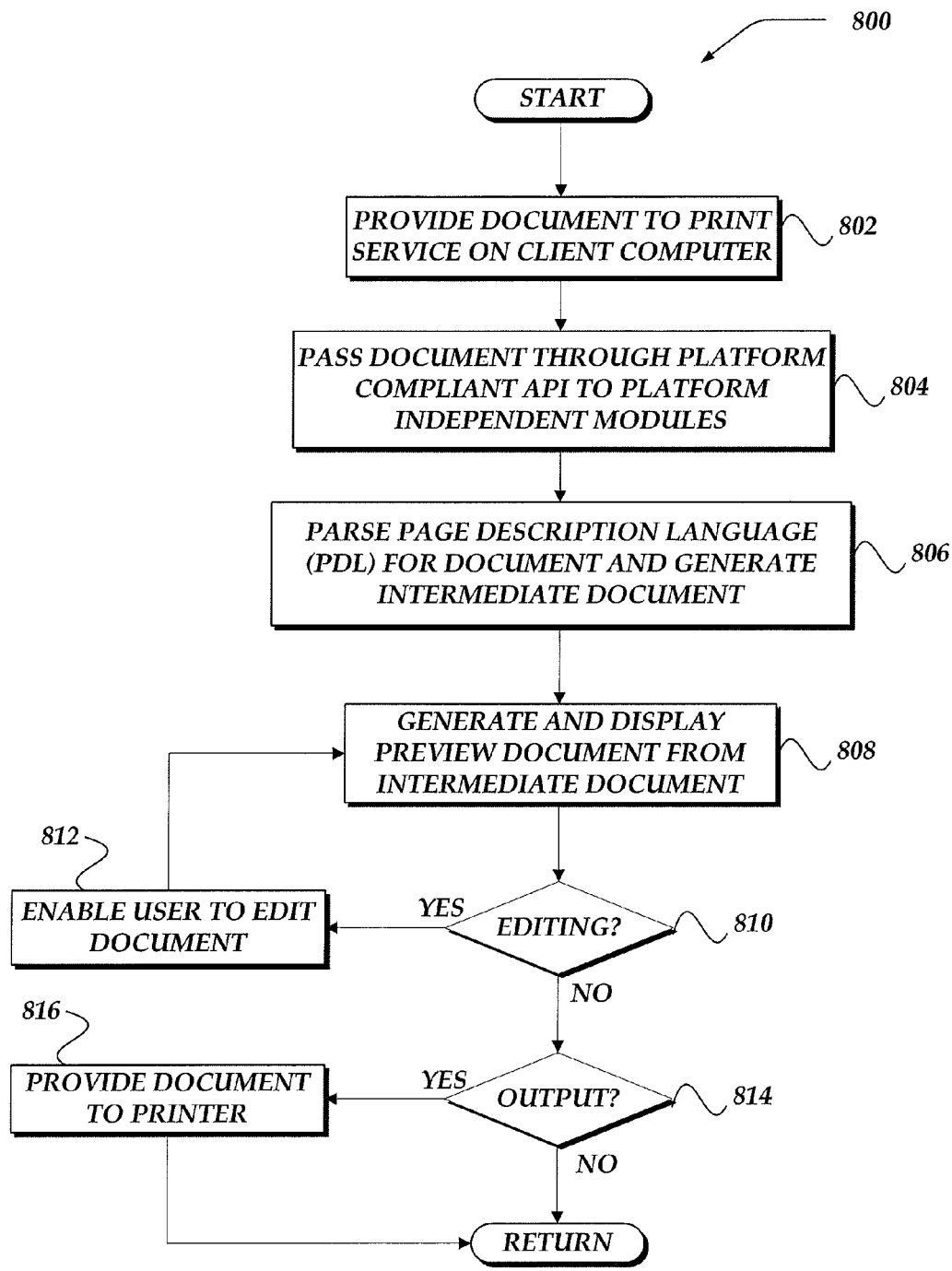
FIG. 8 illustrates a flowchart for a process for universal mobile document viewing in accordance with at least one of the various embodiments.
Figure 9:
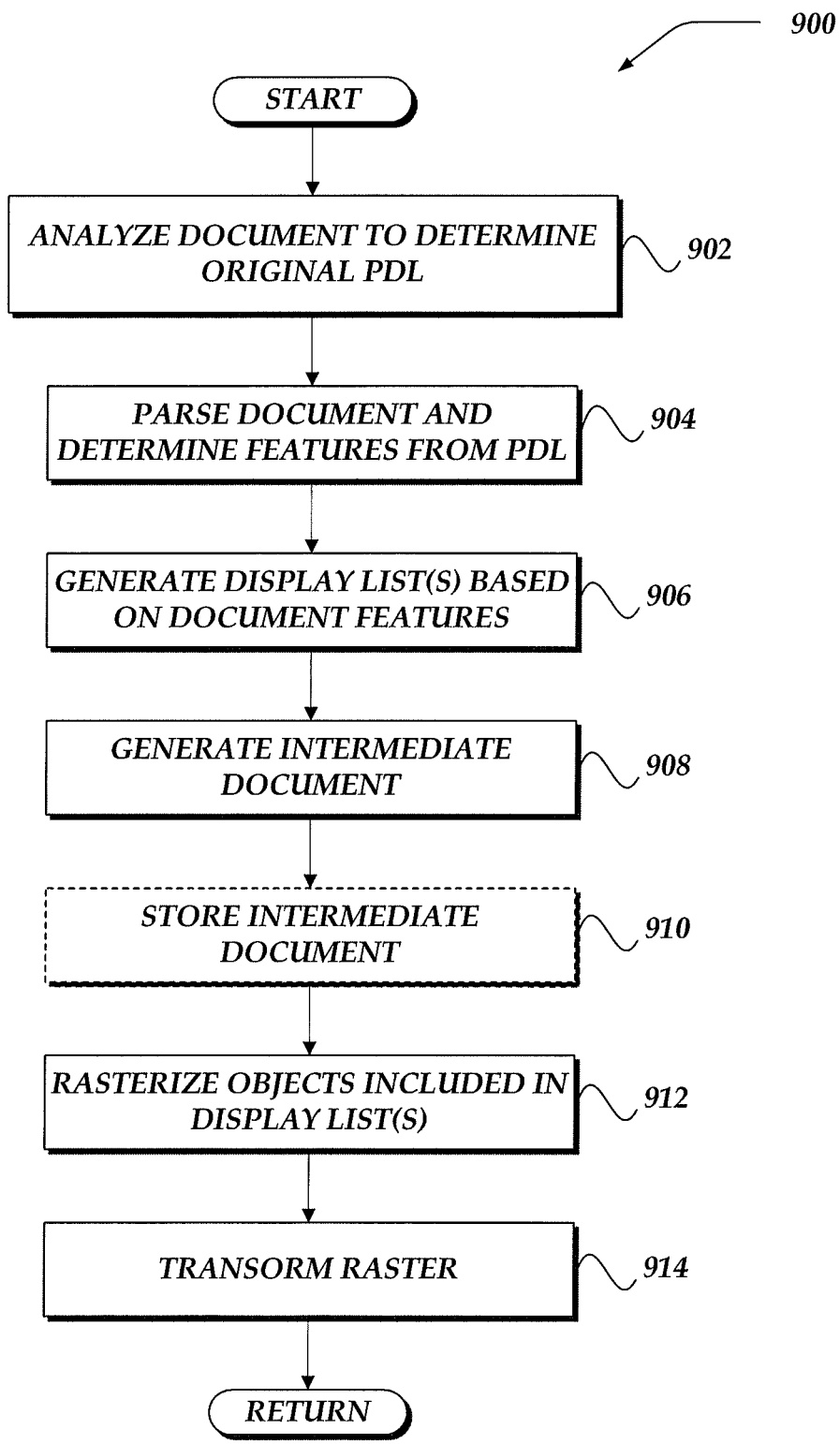
FIG. 9 illustrates a flowchart for a process for rendering a document accordance with at least one of the various embodiments.
Figure 10:
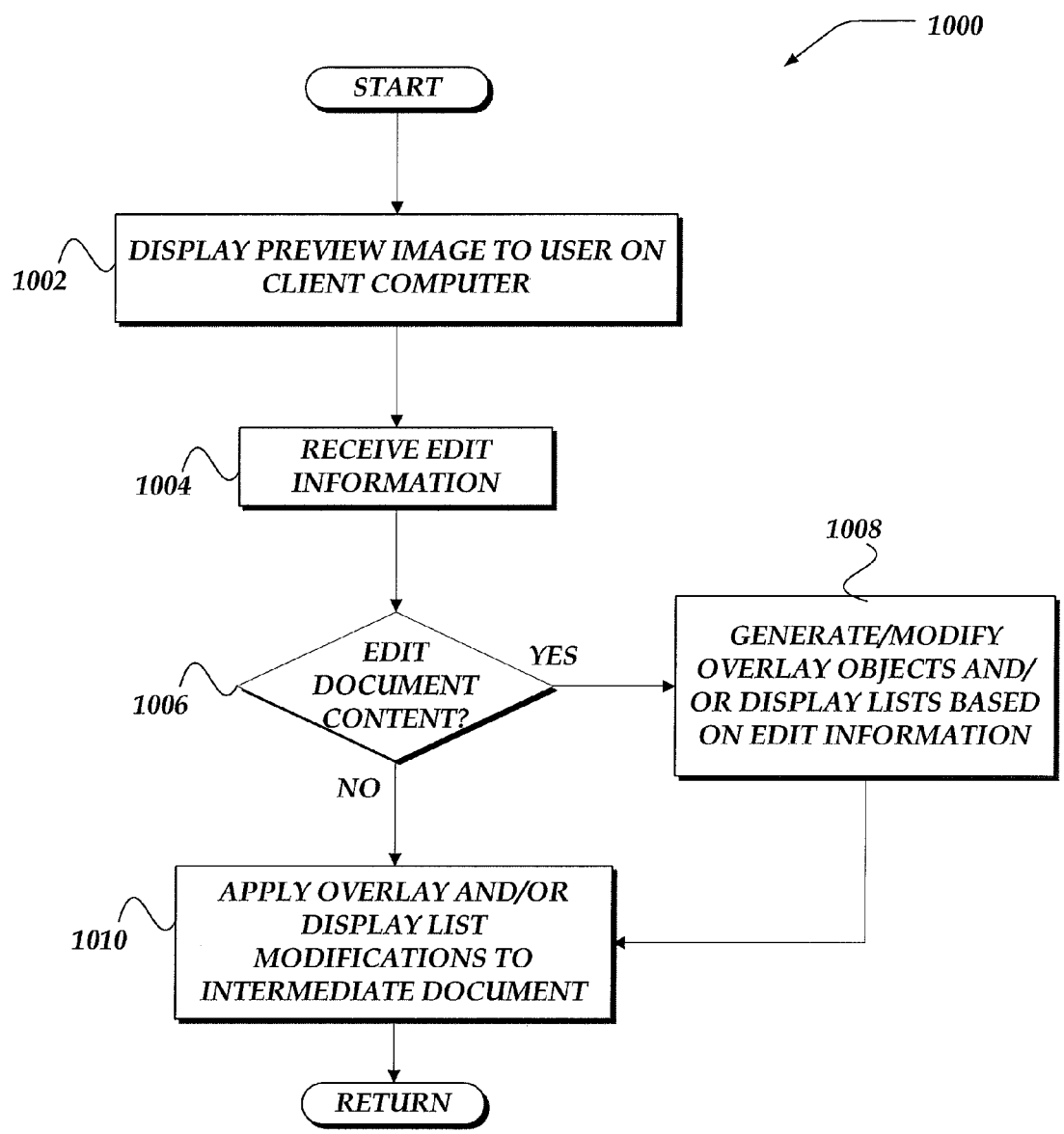
FIG. 10 shows a flowchart for a process for enabling a user to edit a document that is being previewed in accordance with at least one of the various embodiments.

FIGS. 8-10 represent the generalized operations of a universal mobile document viewer in accordance with at least one of the various embodiments. In at least one of the various embodiments, processes 800, 900, and 1000 described in conjunction with FIGS. 8-10 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, in at least one of the various embodiments, the processes described in conjunction with FIGS. 8-10 may be operative in logical architectures such as those described in conjunction with FIGS. 4-7.

FIG. 8 illustrates a flowchart for process 800 for universal mobile document viewing in accordance with at least one of the various embodiments. After a start block, at block 802, in at least one of the various embodiments, a document may be provided to a print and/or print preview service that may be operative on a client computer, such as, client computer 200. For example, in at least one of the various embodiments, another application such as an email application that may be operative on a smart phone may enable a user to preview one or more documents that may be included as attachments to an email.

In at least one of the various embodiments, the application that enables a user to access document printing and/or previewing features may rely on methods, services, and/or data that may be specific to the particular computing platform being used. Accordingly, platform specific functions provided by platform specific API or SDK's may be employed for loading and/or accessing the original document.

At block 804, in at least one of the various embodiments, the document may be passed from platform dependent modules of process 800 to platform independent modules of process 800 using an application API. In at least one of the various embodiments, for each supported computing platform, a compliant and/or natively supported application API layer may be provided. In at least one of the various embodiments, this application layer may be arranged to include one or more interfaces that have the same semantic meaning, operational effect, conceptual parameters, or the like, across all supported computing platforms.

In at least one of the various embodiments, to support the implementation differences and/or incompatibilities between the different computing platforms the application API may include some variance across the platforms, such as, data types, naming conventions, string formatting, parameter passing conventions, or the like.

In at least one of the various embodiments, the application API may be arranged as a transition layer between the platform specific features of the client computer and the platform independent core library. In at least one of the various embodiments, the application API layer (e.g., module 506 in FIG. 5) may be arranged to include to platform specific parsers that enable the original document to be loaded and/or streamed for processing o the core library (modules 510 and 512) absent any platform specific artifacts.

At block 806, in at least one of the various embodiments, the PDL comprising the document may be parsed to generate an intermediate document that may be comprised of an intermediate PDL. In at least one of the various embodiments, at this point since the document has been loaded and provided to the core library layer, the document may be parsed using platform independent parsers.

At block 808, in at least one of the various embodiments, a preview of the original document may be generated based on the intermediate document and displayed to a user. In at least one of the various embodiments, platform independent modules of various applications (e.g., document processing application 222, viewing application 224, or the like) may be arranged to parse the features of the intermediate document for generating a preview of the document for display to a user.

At decision block 810, in at least one of the various embodiments, if a user and/or another automated process, may be editing the document, control may flow to block 812; otherwise, in at least one of the various embodiments, control may flow to decision block 814.

At block 812, in at least one of the various embodiments, the user and/or other automated process may be enabled to edit the intermediate document. In at least one of the various embodiments, a viewing application, such as, viewing application 224 may be arranged to include user interfaces for enabling a user to provide edit information using the same client computer that may be used for displaying the preview of the document. For example, the viewing application may be arranged to display a list of editable objects and/or feature that a user may edit, such as, page numbers, pages ranges to include/exclude from the output document, font sizes, background colors, watermarking, inserting bates numbers, serial numbers, time stamping, or the like, or combination thereof.

In at least one of the various embodiments, one or more automated processes may provide edit information for modifying the document. For example, a process may be arranged to automatically add bates stamps to the pages of a document without any direct involved by a user. Likewise, in at least one of the various embodiments, editing information for adding serial numbers, watermarks, timestamps, or the like, may be automatically added. Next, control may flow back to block 808 so another preview that reflects the editing may be generated. If the editing is being done by a user, it may be an interactive process where the user makes an edit and immediately views an updated preview of the document. Or in other cases, each edit may not require a previewing step to be repeated. For example, if watermarks are being applied to a multi-page document, process 800 may be configured to preview just the first page of the document rather than previewing each page.

At decision block 814, in at least one of the various embodiments, if the user and/or another automated process, determines that an output document should be generated from the intermediate document, control may flow to block 816; otherwise, in at least one of the various embodiments, control may be returned to a calling process. Here, in at least one of the various embodiments, process 800 may generate an output document for printing, storing, sharing, archiving, or the like. As with editing, generating an output document may be an automatic function driven by configuration information, or it may be a "manual" function based on user input, or a combination thereof.

At block 816, in at least one of the various embodiments, an output document may be generated from the intermediate documents and then provided to a printer or other output device. In at least one of the various embodiments, the output document may be rendered from the intermediate document into a raster document or it may be rendered in a another PDL. In at least one of the various embodiments, the output document may be generated such that is comprised of a PDL that may be compatible with one or more output devices, such as, printers, plotters, or the like. Likewise, in at least one of the various embodiments, a user, or one or more predefined configuration values may determine how to render the output document.

FIG. 9 illustrates a flowchart for process 900 for rendering a document in accordance with at least one of the various embodiments. After a start block, at block 902, in at least one of the various embodiments, a provided document may be analyzed to determine an original PDL for the document. For example, process 900 may be arranged to include a sniffer, such as, sniffer 602 for determining the original PDL for an incoming document. In at least one of the various embodiments, process may be arranged to ignore and/or discard incoming documents that may be comprised of unsupported and/or unrecognized PDLs.

At block 904, in at least one of the various embodiments, the original PDL of the document may be parsed to determine the features and/or content of the document. In at least one of the various embodiments, since the PDL comprising the document may be recognized and/or supported, process 900 may be arranged to include parsers and/or parser information that enable the document to be parsed such that all of its features, such as, content, document information (e.g., author, creation date, title, or the like), formatting, font information, layout, embedded graphics/objects, pages, or the like, may be determined.

At block 906, in at least one of the various embodiments, one or more display lists may be generated based on the document features that may have been determined in block 904. In at least one of the various embodiments, each discernible feature of the original document as represented by the PDL information comprising the original document may be mapped and/or translated to one or more feature objects of the intermediate PDL and added to a display list data structure.

In at least one of the various embodiments, each feature object may include information such as page location, font, color, name, an identity, text content, OCR information, raster content, vector information, or the like, or combination thereof. The feature object may be arranged to include sufficient information for faithfully generating a full color raster version of the feature and/or translating the feature object from the intermediate PDL to another standard/well-known PDL such as PDF, Postscript, office application documents, or the like.

At block 908, in at least one of the various embodiments, an intermediate document may be generated from the one or more display lists that may have been determined in block 906. In at least one of the various embodiments, the intermediate document may include meta-information such as document source information as well as the display lists that include the actual document features for the document. At this point, the intermediate document includes all of the feature information that was available in the original document. Except, instead of being represented using one of many possible PDLs they may be represented using the intermediate PDL.

At block 910, in at least one of the various embodiments, optionally, the intermediate document may be stored either locally or remotely for later use, backups, archival purposes, or the like. In at least one of the various embodiments, the intermediate document may be compressed before storing.

At block 912, in at least one of the various embodiments, the various feature objects and/or features included in the display lists that comprise the intermediate document may be converted into raster information and positioned for layout on a page.

At block 914, in at least one of the various embodiments, the feature object and/or the raster information may be transformed into document information compatible with one or more PDLs. In at least one of the various embodiments, the particular PDL target may be determined based on user input or configuration information. In some cases, the PDL type may be automatically selected based on the capabilities of a known output device. Next, control may be return to a calling process.

FIG. 10 shows a flowchart for process 1000 for enabling a user to edit a document that is being previewed in accordance with at least one of the various embodiments. After a start block, at block 1002, a preview image of the document may be displayed to a user. In at least one of the various embodiments, the document may be previewed using a viewing application, such as, viewing application 224.

At block 1004, in at least one of the various embodiments, various edit information may be provided by the user, or in some cases by another process. For example, editing information such as annotation or comments may be added to the document by a user. The annotations content as well as their location within the document being preview may be considered to editing information. Likewise, in at least one of the various embodiments, process 1000 may be arranged to perform one or more "automatic" editing functions, such as, adding page numbers, watermarks, bates stamping, or the like. In these cases, the editing information may be automating added to the document based on template and/or configuration information.

At decision block 1006, in at least one of the various embodiments, if the user or other process determines that the editing information should be included in the output document, control may flow to block 1008; otherwise, control may flow to block 1010.

At block 1008, in at least one of the various embodiments, one or more overlay objects, feature objects, and/or one or more display lists may be generated and/or modified based on the provided edit information. In at least one of the various embodiments, the editing information may be used to generate one or more feature objects that may be may be added to a display list that is included as part of the intermediate document. In other cases, a new display list may be created to hold the feature objects and added to the intermediate document.

In at least one of the various embodiments, overlay objects may be generated for edit information that may not be easily integrated into an document. For example, watermarks information may be maintained in an overlay data structure that may be associated with the intermediate document but held separate from the display lists.

At block 1010, in at least one of the various embodiments, the overlay objects and/or the feature objects included in the display lists may be applied and/or added to the intermediate document. Next, control may be returned to a calling process.

Illustrative Operating Environment for Mobile Printer Controller

Figure 11:
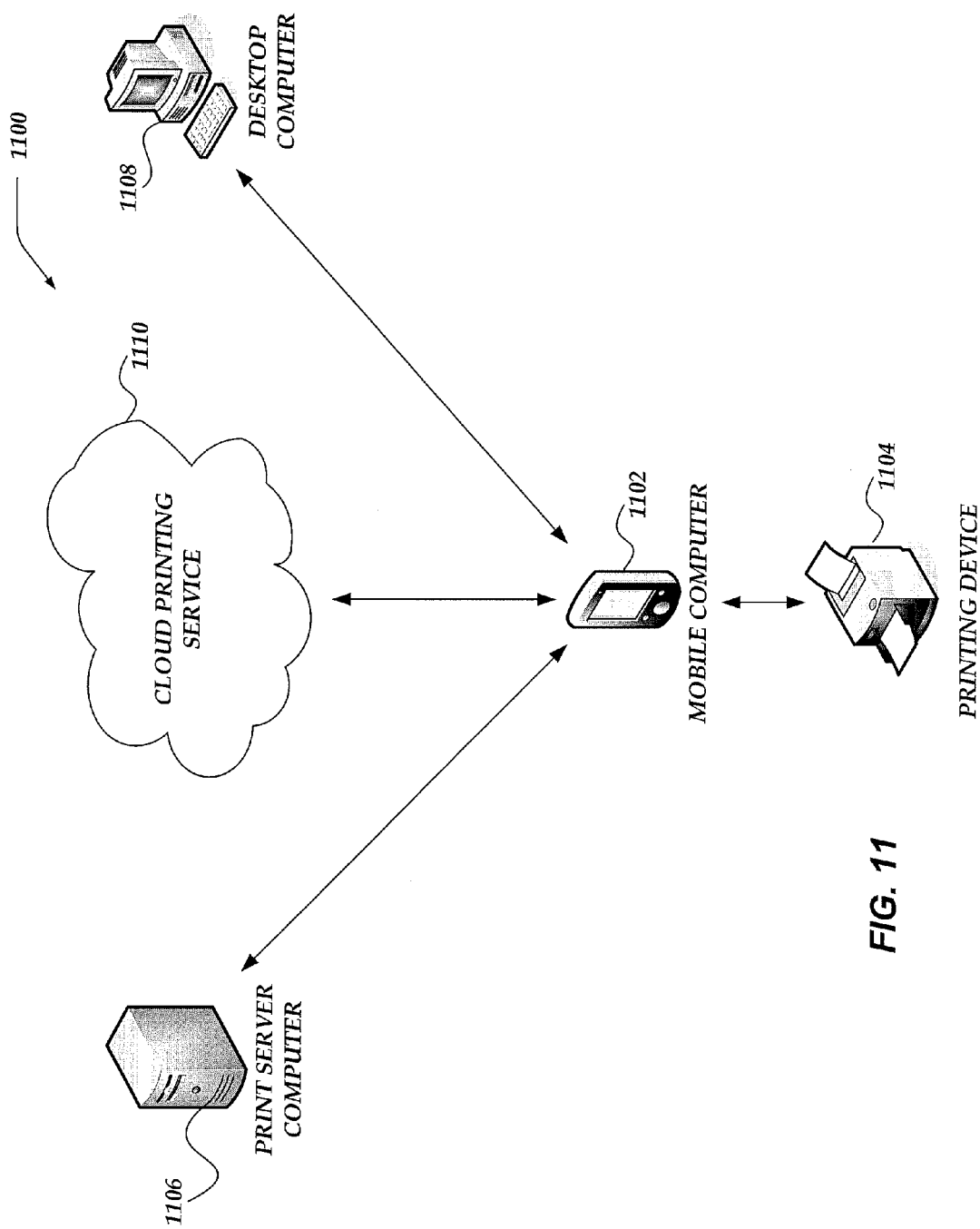
FIG. 11 shows components of one embodiment of an environment in which various embodiments of the invention may be practiced.

FIG. 11 shows components of one embodiment of an environment in which various embodiments of the invention may be practiced. Not all of the components may be required to practice the various embodiments, and variations in the arrangement and type of the components may be made without departing from the spirit or scope of the invention. As shown, system 1100 of FIG. 11 may include mobile computer 1102, printing device 1104, printer server computer 1106, desktop computer 1108, cloud printing service 1110. Accordingly, in at least one of the various embodiments, mobile computer 1102, and desktop computer 1108 may be an embodiment of client computer 200. Also, in at least one of the various embodiments, other client computers, such as, client computers 102-105 may be operative in system 1100.

Similarly, in at least one of the various embodiments, print server computer 1106 may be an embodiment of network computer 300. And, in at least one of the various embodiments, may be similar to print server computer 114. In at least one of the various embodiments, print server computer may be arranged to include applications, such as, print server application 319 and/or print queue 320. Further, in at least one of the various embodiments, printer device 1106 may represent an embodiment of printing device 400, or the like.

In at least one of the various embodiments, cloud printing service 1110 may represent one or more cloud based printing services that provide remote print queues, enabling printing to one or more remote and/or registered printing devices, such as, printing device 1104, or the like.

In at least one of the various embodiments, mobile computer 1102, printing device 1104, printer server computer 1106, desktop computer 1108, cloud printing service 1110 may be coupled together by one or more networks (not shown) such as network 108 shown in FIG. 1. Further, in at least one of the various embodiments, one or more of the computers and/or devices in system 1100 may be segmented into one or more private and/or public networks or cloud environments.

In at least one of the various embodiments, each component in system may be arranged and/or configured to communicate using one more networking technologies and/or network protocols. For example, in at least one of the various embodiments, mobile computers may communicate with other computers or printers using WiFi, Bluetooth, NFC, cellular data networks, or the like, as described above, for network 108 in FIG. 1. Also, one or more network technologies may be in use at the same time. For example, in at least one of the various embodiments, the mobile computer may communicate with a printer using Bluetooth, WiFi to communication with a desktop computer, and cellular data networks for communicating with a cloud printing service.

In at least one of the various embodiments, mobile computer 1102 may be arranged to include one or more applications, such as, document processing application 222, that may be arranged for communicating document processing information to other computers and/or devices, such as, print server computer 1106, desktop computer 1108, printing device 1104, cloud printing service 1110, or the like. Accordingly, in at least one of the various embodiments, document processing application 222 may be arranged to interact with and/or observe print queues that may be managed and/or located on various devices, such as, print server computer 1106, desktop computer 1108, printing device 1104, cloud printing service 1110, or the like. In at least one of the various embodiments, these interactions and/or communications may be over a network such as network 108.

In at least one of the various embodiments, document processing application 222 may be arranged to work in concert with other applications, such as, viewing application 224 to enable a user to work with and/or manipulate print queues and the documents therein to perform various actions, such as, previewing documents before printing, editing documents before printing, converting documents from one PDL to another PDL, or the like.

FIGS. 12-15 represent sequence diagrams for various embodiments of a mobile printer controller. They illustrate sequences that corresponds to one or more mobile printer controller operations. The steps may be performed by one or more of mobile computer 1102, printing device 1104, print server computer 1106, desktop computer 1108, cloud printing service 1110, or the like. In at least one of the various embodiments, applications operative on a mobile computer, such as, document processing application 222 and/or viewing application 224, may be arranged to perform actions for one or more of sequences 1200, 1300, 1400, and/or 1500 as depicted below. Likewise, in at least one of the various embodiments, applications, such as print service application 319 and/or print queue 320 may be arranged to perform actions for one or more of sequences 1200, 1300, 1400, and/or 1500 as depicted below.

Figure 12:
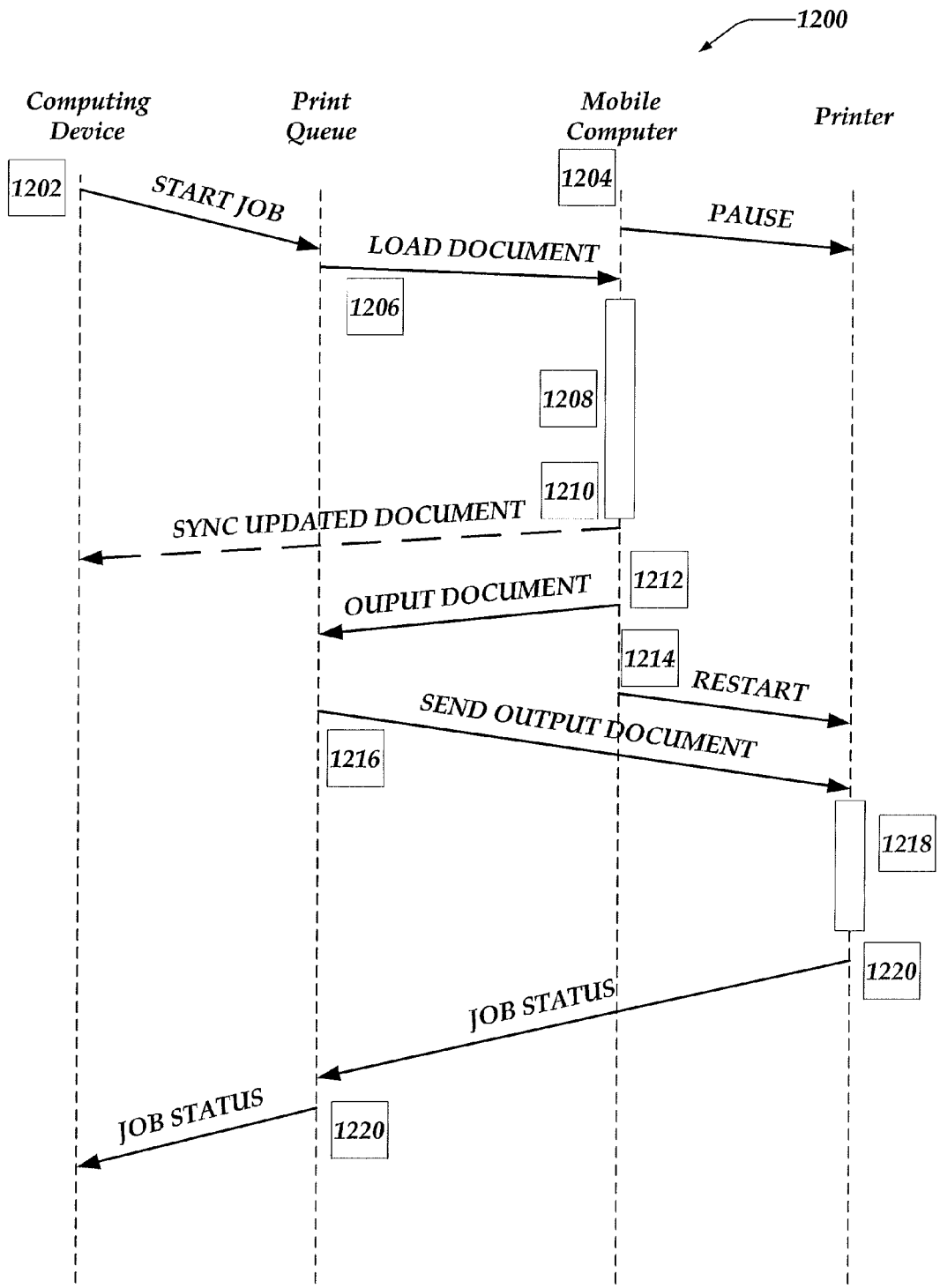
FIGS. 12-15 represent sequence diagrams for various embodiments of a mobile printer controller in accordance with at least one of the various embodiments.

FIG. 12 shows a sequence diagram for sequence 1200 for a mobile printer controller in accordance with at least one of the various embodiments. Sequence 1200 illustrates a sequence of operations that may be performed by various embodiments. One of ordinary skill in the art will appreciate that other sequences may be employed and/or more or fewer participants may be included without departing from the scope of the innovations described herein. Accordingly, while not exhaustive, sequence 1200 is sufficient to enable one of ordinary skill in the art to at least understand these innovations.

At step 1202, in at least one of the various embodiments, a user or other process may initiate a print job by communicating a start job message, or similar message to a print queue that may be managed by and/or located on a print server computer, such as, print server computer 1106. Also, in at least one of the various embodiments, the print queue shown in sequence 1200 may be representative of one or more print queues that may be part of a cloud printing service, such as, cloud printing service 1110, or the like.

At step 1204, in at least one of the various embodiments, a mobile computer, such as, mobile computer 1102, may be arranged and/or configured to monitor the print queue. Accordingly, in at least one of the various embodiments, if a new job may be detected the mobile computer may communicate a pause message to the printer designated and/or configured for print the documents that may be associated with the detected print job.

In at least one of the various embodiments, the print queue may be an application, such as, print queue 320 operative in printer server computer, or within a cloud printing server.

In at least one of the various embodiments, the mobile computer may be arranged to employ one or more well-known and/or published API's and/or interfaces for interacting with the printers and the print queues. In at least one of the various embodiments, if the available interfaces may be insufficient, custom interfaces may be installed on the printers, print server computers, or the like.

At step 1206, in at least one of the various embodiments, the mobile computer may determine the document that may be associated with the job and transfer it from the print queue to the mobile computer.

At step 1208, in at least one of the various embodiments, the mobile computer may enable a user to preview and/or edit the document on the mobile computer. For example, in at least one of the various embodiments, document processing application 222 and/or viewing application 224 may be arranged to support previewing and/or editing of the document directly on the mobile computer.

In at least one of the various embodiments, a user-interface on the mobile computer may be employed to edit information displayed in a preview document, wherein the edited information may be employed to generate an updated intermediate document and to also generate another preview document that is based on the updated intermediate document and displayable in the user-interface.

At step 1210, in at least one of the various embodiments, optionally, during the editing and previewing in step 1208, or when step 1208 may be finished, the updated document may be synced back to the computing device that initiated the print job in the first place. In at least one of the various embodiments, syncing at this step enables the user to the update document and preserve any edits that may have been performed. This step is optional because, the user may not have made any edits, or they may have not interest in preserving them.

In at least one of the various embodiments, the syncing operation may be configured to occur automatically. Also, in at least one of the various embodiments, the sync operation may be configured to sync the updated document in a data store other than and/or in addition to the originating computer. For example, in at least one of the various embodiments, the document processing application may be configured to automatically store each updated document in a archive data store.

At step 1212, in at least one of the various embodiments, the mobile computer may generate an output document based on the updated intermediate document and provide the output document to the print queue. And at step 1214, in at least one of the various embodiments, the mobile computer may send a restart message to the printer.

In at least one of the various embodiments, the mobile computer may provide the output document directly to the printer rather than providing the output document to the print queue. In such cases, the mobile computer may be arranged to send a status message to the print queue to cancel or delete the job, change the job status to completed.

At step 1216, in at least one of the various embodiments, the output document may be provided to the printer for printing. As discussed above, in some embodiments, the output document may be provided to the printer directly from mobile computer.

At step 1218, in at least one of the various embodiments, the printer may print the output document. At step 1220, in at least one of the various embodiments, upon completion and/or failure of the printing of the output document, the printer may communicate a job status message to the print queue indicating the success or failure of the print job. At step 1220, in at least one of the various embodiments, the print queue may communicate the job status to the computing device where the print job originated.

Figure 13:
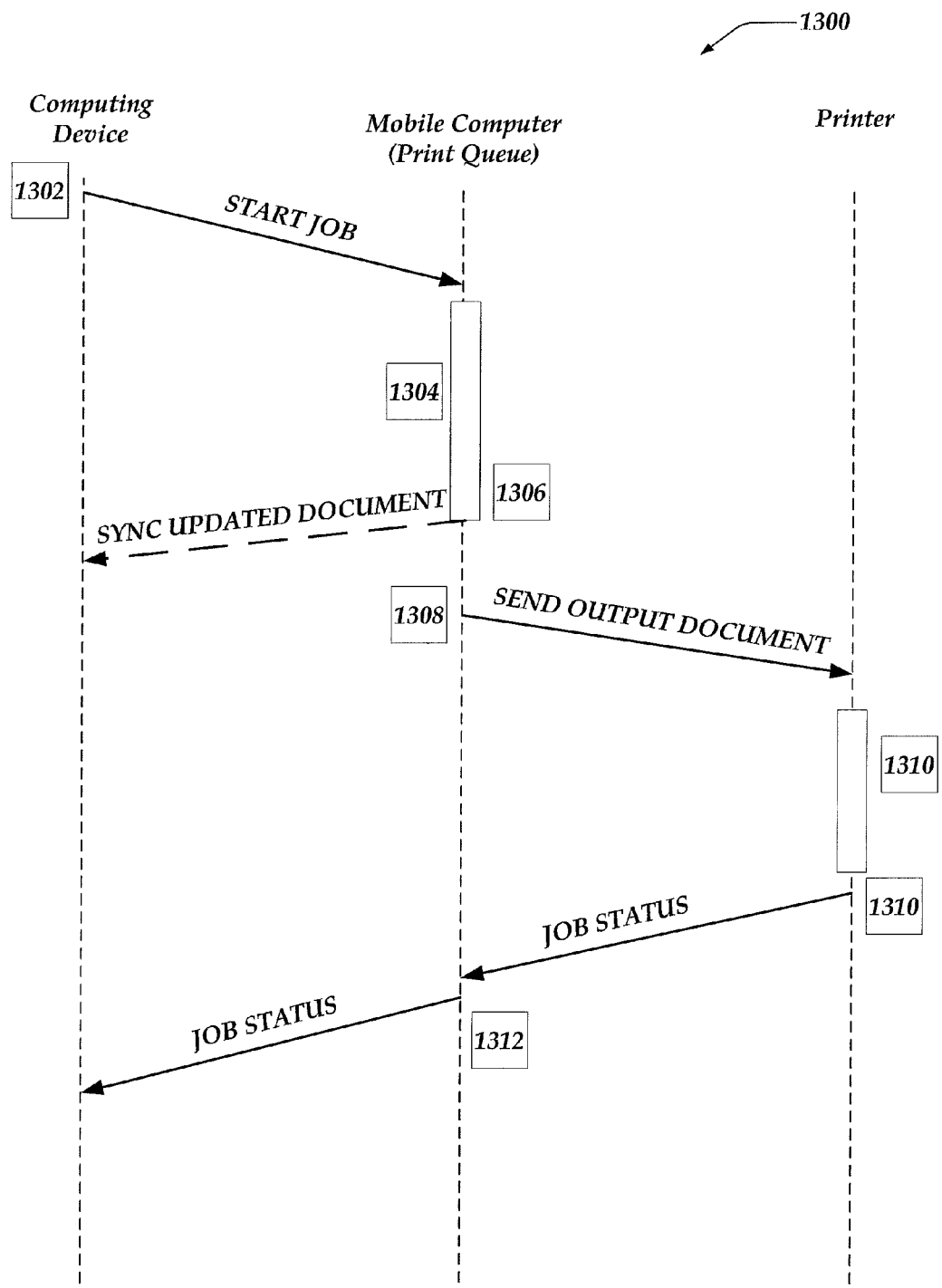

FIG. 13 shows a sequence diagram for sequence 1300 for a mobile printer controller operating as a print queue in accordance with at least one of the various embodiments. Sequence 1300 illustrates a sequence of operations that may be performed by various embodiments. One of ordinary skill in the art will appreciate that other sequences may be employed and/or more or fewer participants may be included without departing from the scope of the innovations described herein.

Accordingly, while not exhaustive, sequence 1300 is sufficient to enable one of ordinary skill in the to understand these innovations.

In at least one of the various embodiments, in this sequence the mobile computer is arranged and/or configured to operate as print queue. Accordingly, it may be registered with one or more computing devices as printer or print service that is able to receive print jobs.

At step 1302, in at least one of the various embodiments, a user may initiate a print job by sending a document for printing to a mobile computer that may be acting as a print queue. Accordingly, in at least one of the various embodiments, the print queue may be located on the mobile computer.

At step 1304, in at least one of the various embodiments, the mobile computer may receive the document. In at least one of the various embodiments, the mobile computer may enable a user to preview and/or edit the document on the mobile computer. For example, in at least one of the various embodiments, document processing application 222 and/or viewing application 224 may be arranged to previewing and/or editing of the document.

In at least one of the various embodiments, a user-interface on the mobile computer may be employed to edit information displayed in a preview document, wherein the edited information may be employed to generate an updated intermediate document and to also generate another preview document that is based on the updated intermediate document and displayable in the user-interface.

At step 1306, in at least one of the various embodiments, optionally, at any time during the editing and previewing in step 1304, or when step 1304 may be finished, an updated document based on the updated intermediate document may be synced back to the computing device that initiated the print job in the first place. In at least one of the various embodiments, syncing at this step enables the user to save the update document and preserve any edits that may have been performed. This step is optional because the user may not have made any edits, or they may have not been interested in preserving any edits that were made.

In at least one of the various embodiments, the syncing operation may be configured to occur automatically. Also, in at least one of the various embodiments, the sync operation may be configured to save the updated document in a data store other than and/or in addition to the originating computer. For example, in at least one of the various embodiments, the document processing application may be configured to automatically store each updated document in a archive data store.

At step 1308, in at least one of the various embodiments, the mobile computer may generate an output document based on the updated intermediate document and provide the output document directly to the printer for printing.

At step 1310, in at least one of the various embodiments, the printer may begin printing the output document. At step 1310, in at least one of the various embodiments, upon completion and/or failure of the printing of the output document the printer may communicate a job status message the mobile computer indicating the success or failure of the print job. At step 1312, in at least one of the various embodiments, the mobile computer may communicate the job status to the computing device where the print job originated.

Figure 14:
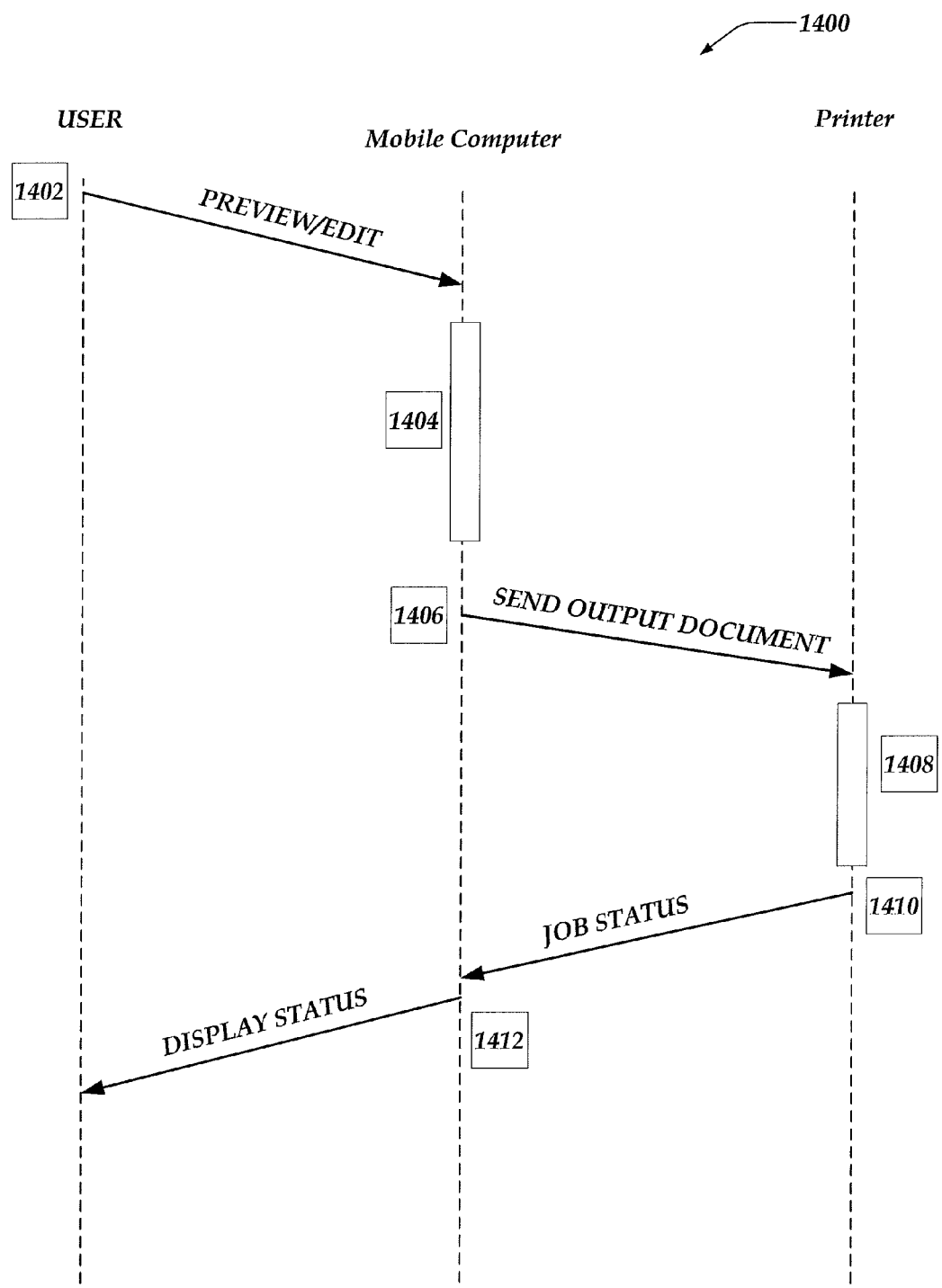

FIG. 14 shows a sequence diagram for sequence 1400 for a mobile printer controller operating as a print queue in accordance with at least one of the various embodiments. Sequence 1400 illustrates a sequence of operations that may be performed by various embodiments. One of ordinary skill in the art will appreciate that other sequences may be employed and/or more or fewer participants may be included without departing from the scope of the innovations described herein. Accordingly, while not exhaustive, sequence 1400 is sufficient to enable one of ordinary skill in the to understand these innovations. In at least one of the various embodiments, in this sequence the mobile computer is arranged and/or configured to originate the print job in response to user input.

At step 1402, in at least one of the various embodiments, a user may initiate a print job by using a user interface on the mobile computer to command it to preview and/or edit an original document that may be located on the mobile computer.

At step 1404, in at least one of the various embodiments, the mobile computer may enable a user to preview and/or edit the document on the mobile computer. For example, in at least one of the various embodiments, document processing application 222 and/or viewing application 224 may be arranged to previewing and/or editing of the document.

In at least one of the various embodiments, a user-interface on the mobile computer may be employed to edit information displayed in a preview document, wherein the edited information may be employed to generate an updated intermediate document and to also generate another preview document that is based on the updated intermediate document and displayable in the user-interface.

At step 1406, in at least one of the various embodiments, the mobile computer may generate an output document based on the updated intermediate document and provide the output document directly to the printer for printing.

At step 1408, in at least one of the various embodiments, the printer may begin printing the output document. At step 1410, in at least one of the various embodiments, upon completion and/or failure of the printing of the output document the printer may communicate a job status message the mobile computer indicating the success or failure of the print job. At step 1412, in at least one of the various embodiments, the mobile computer may be arranged to indicate the status of the job by way of its user interface to communicate the job status to the user.

Figure 15:
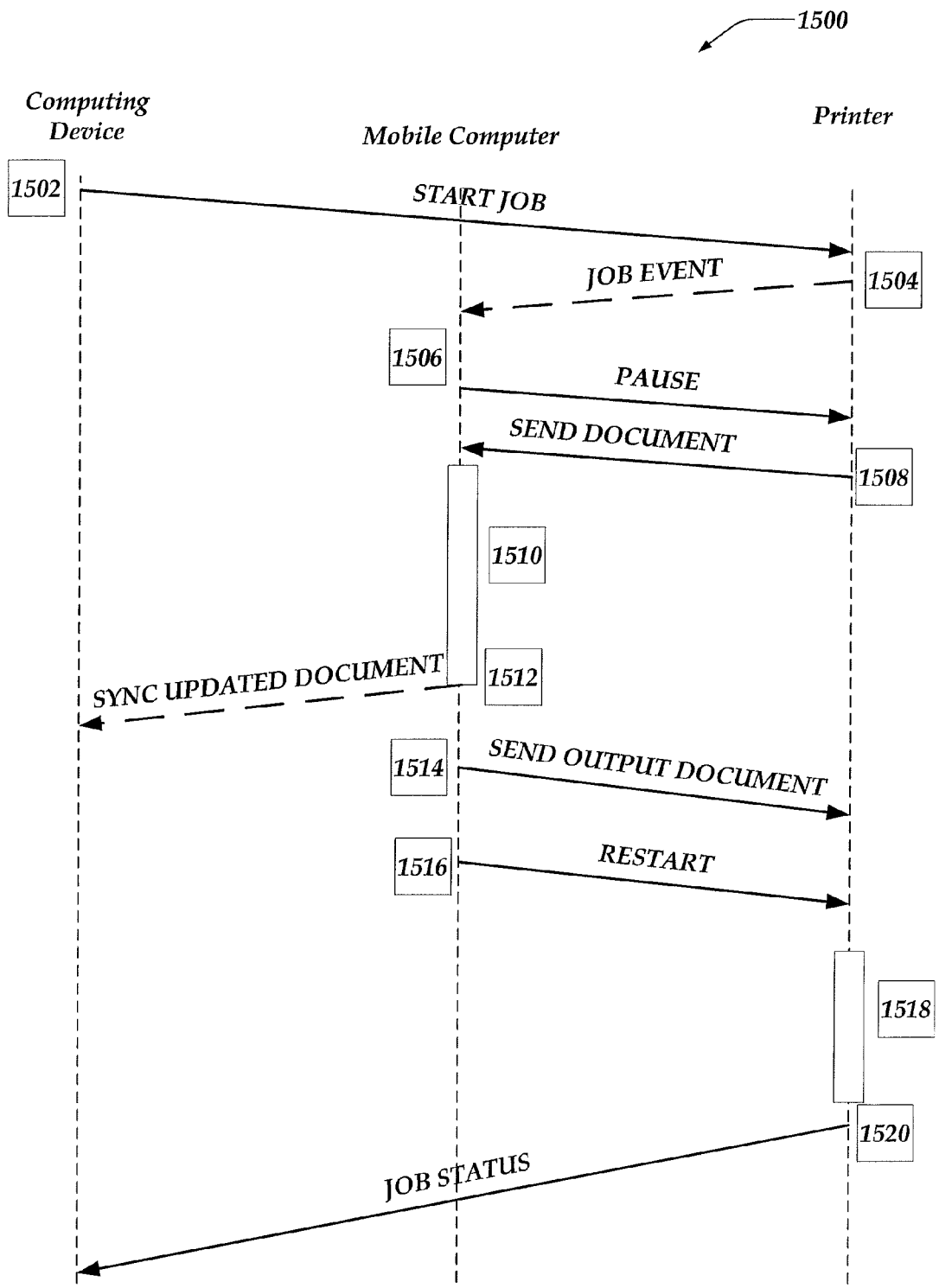

FIG. 15 shows a sequence diagram for sequence 1500 for a mobile printer controller operating as a print queue in accordance with at least one of the various embodiments. Sequence 1500 illustrates a sequence of operations that may be performed by various embodiments. One of ordinary skill in the art will appreciate that other sequences may be employed and/or more or fewer participants may be included without departing from the scope of the innovations described herein. Accordingly, while not exhaustive, sequence 1500 is sufficient to enable one of ordinary skill in the to understand these innovations.

In at least one of the various embodiments, in this sequence the mobile computer is arranged to work with a "smart" printer device that may interact with the mobile computer if a print job may be received. In at least one of the various embodiments, the printer device may be operative as both the print queue and the printing device.

At step 1502, in at least one of the various embodiments, a user may initiate a print job by sending a document for printing directly to a print device. At step 1504, in at least one of the various embodiments, the printer may be arranged to communicate with the mobile computer and provide one or messages that may indicate the arrival of the print job. In at least one of the various embodiments, the printer may include a print queue for receiving print jobs and/or original documents for printing.

At step 1506, in at least one of the various embodiments, optionally, if a user wants to edit or preview the document, the mobile computer may communicate a pause message to the printer and request the document. In at least one of the various embodiments, the mobile computer may display a notification that print job has been sent to the printer. Accordingly, an application on the mobile computer, such as, document processing application 222, may display a notification on its user interface alerting the user of the pending print job.

In at least one of the various embodiments, the mobile computer may be configured to automatically send a pause job message to the printer as soon as the printer notifies the mobile computer about the print job. Likewise, in at least one of the various embodiments, the printer may be configured to automatically pause the job until it receives a message from the mobile computer to process the print job.

At step 1508, in at least one of the various embodiments, the print device may provide the document to the mobile computer. In at least one of the various embodiments, the mobile computer may communicate with the printer and request that the document be downloaded or otherwise transferred to the mobile computer.

At step 1510, in at least one of the various embodiments, the mobile computer may enable a user to preview and/or edit the document on the mobile computer. For example, in at least one of the various embodiments, document processing application 222 and/or viewing application 224 may be arranged to previewing and/or editing of the document.

In at least one of the various embodiments, a user-interface on the mobile computer may be employed to edit information displayed in a preview document, wherein the edited information may be employed to generate an updated intermediate document and to also generate another preview document that is based on the updated intermediate document and displayable in the user-interface.

At step 1512, in at least one of the various embodiments, optionally, at any time during the editing and previewing in step 1510, or when step 1510 may be finished, an updated document based on the updated intermediate document may be synced back to the computing device that initiated the print job in the first place. In at least one of the various embodiments, syncing at this step enables the user to save the update document and preserve any edits that may have been performed. This step is optional because the user may not have made any edits, or they may have not been interested in preserving any edits that were made.

In at least one of the various embodiments, the syncing operation may be configured to occur automatically. Also, in at least one of the various embodiments, the sync operation may be configured to save the updated document in a data store other than and/or in addition to the originating computer. For example, in at least one of the various embodiments, the document processing application may be configured to automatically store each updated document in a archive data store.

At step 1514, in at least one of the various embodiments, the mobile computer may generate an output document based on the updated intermediate document and provide the output document directly to the printer for printing. At step 1516, in at least one of the various embodiments, the mobile computer may communicate a restart message to printer.

At step 1518, in at least one of the various embodiments, the printer may begin printing the output document. At step 1520, in at least one of the various embodiments, upon completion and/or failure of the printing of the output document, the printer may communicate a job status message to the computing device where the print job originated. In at least one of the various embodiments, optionally, the printer may also communicate a job status message to the mobile computer.

Generalized Operations of a Mobile Printer Controller

Figure 16:
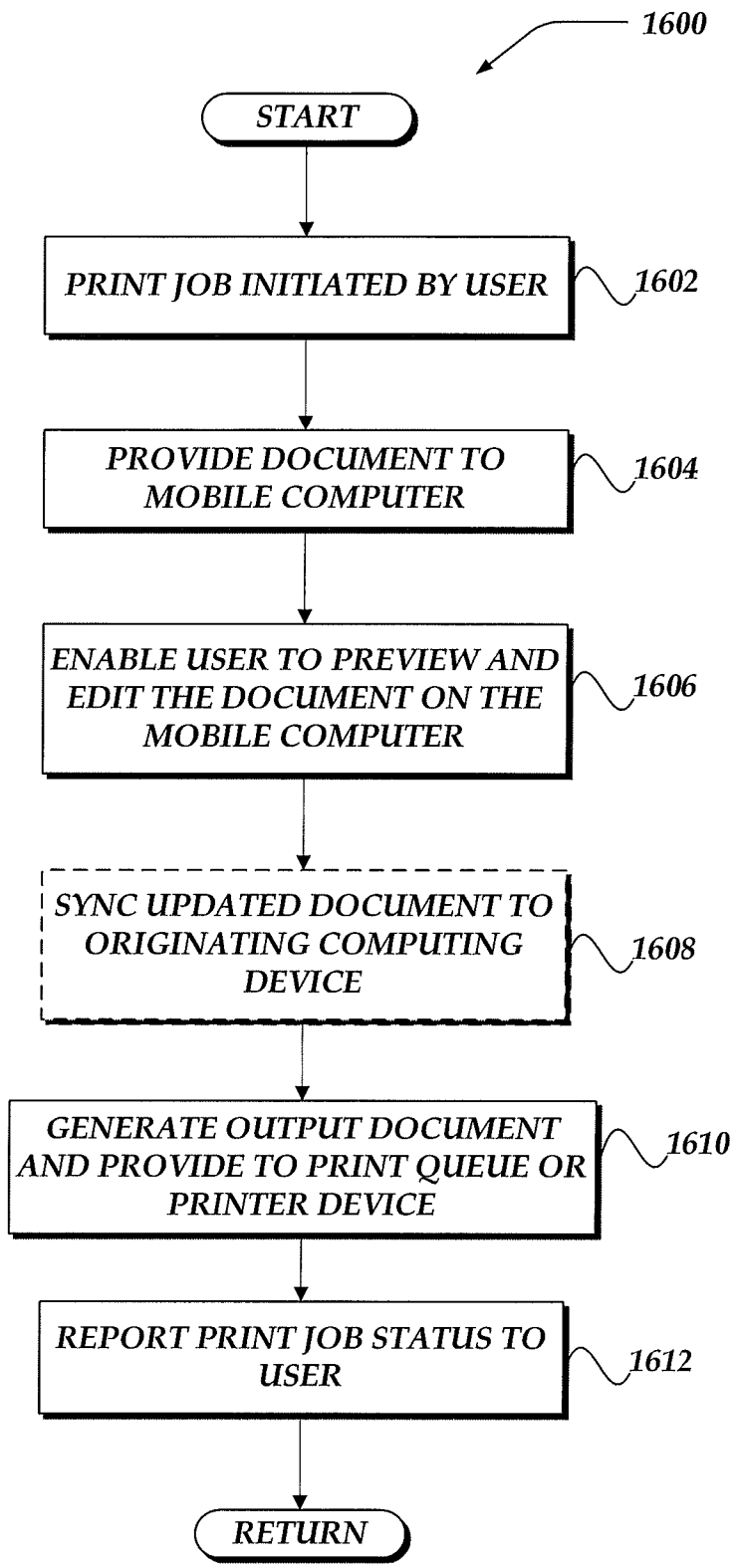
FIG. 16 illustrates a flowchart for a process for a mobile printer controller in accordance with at least one of the various embodiments.

FIG. 16 represents generalized operations of a mobile printer controller in accordance with at least one of the various embodiments. In at least one of the various embodiments, process 1600 described in conjunction with FIG. 16 may be implemented by and/or executed on a mobile computer, network computer, or printer device, such as client computer 200, network computer 300, or printer device 400, respectively. However, embodiments are not so limited, and various combinations of network computers, client computers, mobile computer, virtual machines, printer devices, or the like may be utilized. Further, in at least one of the various embodiments, the process described in conjunction with FIG. 16 may be operative in logical architectures such as those described in conjunction with FIG. 11 and may be operative to be perform the actions for at least the sequences described in conjunction with FIGS. 12-15.

Further, FIG. 16 illustrates a flowchart for process 1600 for a mobile print controller in accordance with at least one of the various embodiments. After a start block, at block 1602, a print job may be initiated by a user. In at least one of the various embodiments, as described above, a user may initiate a print job from a client computer, such as, desktop computer, laptop computer, other network computer, other mobile computer, or the like.

In at least one of the various embodiments, the print job may provided to a print queue on managed by a print server computer and/or cloud printing service, or the like. In other embodiments, a user may initiate a print job directly from the mobile computer. In at least one of the various embodiments, the print job may be associated with one or more documents that are intended to be printed. In at least one of the various embodiments, the print queue may be located on the mobile computer. Also, in at least one of the various embodiments, the provided documents may be comprised of a PDL.

At block 1604, in at least one of the various embodiments, a document corresponding to the print job may be provided to a mobile computer. In at least one of the various embodiments, as described above, if the document associated with the print job may located in a print queue, it may be provided from the print queue to the mobile computer over a network. In at least one of the various embodiments, the document may already be present on the mobile computer, or it may be download from another location, such as, as website. Also, in at least one of the various embodiments, the mobile computer may be registered as the print queue for the originating computer so it may send document directly to the mobile computer as part of initiating the print job.

In at least one of the various embodiments, the mobile computer may generate an intermediate document based on the original document. In at least one of the various embodiments, the mobile computer may send a message that causes the printer to pause the print job while the document is being previewed and/or processed on the mobile computer.

At block 1606, in at least one of the various embodiments, the user may be enabled to preview and/or edit the document on the mobile computer and using the mobile computer. In at least one of the various embodiments, if the document is provided to the mobile computer, the user may be enabled to preview and/or edit the document using the computing resources of the mobile computer.

In at least one of the various embodiments, a user-interface on the mobile computer may be employed to edit information displayed in the preview document, wherein the edited information may be employed to generate an updated intermediate document and to also generate another preview document that may be based on the updated intermediate document and displayable in the user-interface. Further, in at least one of the various embodiments, an updated document that comprises PDL and is based on the updated intermediate document may be generated by the mobile computer.

In at least one of the various embodiments, the previewing and editing process may be as described in conjunction with FIGS. 4-10. However, these innovations are not limited to the embodiments described for FIGS. 4-10. Other editing and previewing processes than just those described herein are envisaged to be within the scope of these innovations.

At block 1608, in at least one of the various embodiments, optionally, the updated documents may be synced the computer or computing device where the print job was initiated. In at least one of the various embodiments, users may sync to the updated documents to one or more data stores during the editing process and/or after the document the editing process has finished. In at least one of the various embodiments, the syncing may occur over a network, such as, network 108. Also, in at least one of the various embodiments, the updated document may be synced to one or more locations in addition to and/or instead of the computer where the job originated.

At block 1610, in at least one of the various embodiments, an output document may be generated and provided to a print queue, or a printer device for printing. In at least one of the various embodiments, the output document may be based on the updated intermediate document may include the edit information that may have been added by the user during block 1608.

In at least one of the various embodiments, before providing the output document to print queue or printer, the mobile computer may generate an output document that may be comprised of a particular PDL. In at least one of the various embodiments, as described above, the output document may comprised of a PDL that is compatible with the selected printer. In some cases, the output document may be comprised of a different PDL than the original document.

In at least one of the various embodiments, the mobile computer, may be arranged to include an application, such as, document processing application 222 that may be arranged to generate an output document comprised of one of the various PDL's.

At block 1612, in at least one of the various embodiments, the print job status may be reported to the user that initiated the print job. In at least one of the various embodiments, depending on how the system and/or the mobile computer may be configured, the job status may be reported directly to the user of the mobile computer. Or, in at least one of the various embodiments, the job status may be "relayed" through one or more participants (e.g., mobile computers, print queues, printers, ort the like). Next, in at least one of the various embodiments, control may be returned to a calling process.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

Furthermore, in at least one of the various embodiments, the actions specified in one or more blocks may be per-

What is claimed as new and desired to be protected by Letters Patent of the United States is:

1. A method for processing documents on a mobile computer, comprising:
   receiving, at the mobile computer, a message from a print queue indicating that a print job has been received;
   sending a pause command to the print queue and a request for an intermediate document associated with the print job received by the print queue, in response to receiving the message;
   receiving, at the mobile computer from a print queue, the intermediate document in a format that is independent of a computing platform and operating system, and wherein the intermediate document is based on a document that is dependent on one or more of a computing platform and an operating system of a remote computing device;
   displaying a preview of the intermediate document via a software application configured to accept edits to the intermediate document;
   determining whether edits to the preview of the intermediate document are received, and in response to determining that edits are received:
      updating the preview of the intermediate document with the edits to produce an output document in a format that is independent of a computing platform and operating system;
      syncing the output document with the document that is dependent on one or more of a computing platform and an operating system of the remote computing device, stored on one or more remote data stores; and
      sending the output document to the print queue.

2. The method of claim 1, wherein the print queue is located on the mobile computer.

3. The method of claim 1, further comprising, receiving a status report comprising a result of printing the output document.

4. The method of claim 1, wherein syncing the output document to the document that is dependent on one or more of a computing platform and an operating system of a remote computing device, stored on one or more remote data stores comprises:
   sending the output document to the one or more remote data stores, causing the one or more remote data stores to update a stored version of the document that is dependent on one or more of a computing platform and an operating system of a remote computing device with the output document.

5. The method of claim 1, further comprising:
   sending a restart command to the print queue in response to producing an output document.

6. The method of claim 1, further comprising:
   sending a restart command to the print queue in response to determining that edits to the preview of the intermediate document are not received.

7. The method of claim 1, further comprising:
   sending the intermediate document to the print queue in response to determining that edits to the preview of the intermediate document are not received.

8. A mobile computer for processing documents, comprising:
   a transceiver for communicating over a network;
   a processor configured with processor-executable instructions to perform operations comprising:
      receiving, at the mobile computer, a message from a print queue indicating that a print job has been received;
      sending a pause command to the print queue and a request for an intermediate document associated with the print job received by the print queue, in response to receiving the message;
      receiving, at a mobile computer from the print queue, the intermediate document in a format that is independent of a computing platform or operating system, and wherein the intermediate document is based on an original document that is dependent on one or more of a computing platform and an operating system of a remote computing device;
      displaying a preview of the intermediate document via a software application configured to accept edits to the intermediate document;
      determining whether edits to the preview of the intermediate document are received, and in response to determining that edits are received:
         updating the preview of the intermediate document with the edits to produce an output document in a format that is independent of a computing platform and operating system;
         syncing the output document with the document that is dependent on one or more of a computing platform and an operating system of the remote computing device, stored on one or more remote data stores; and
         sending the output document to the print queue.

9. The mobile computer of claim 8, wherein the print queue is located on the mobile computer.

10. The mobile computer of claim 8, wherein the processor is further configured to perform operations comprising receiving a status report comprising a result of printing the output document.

11. The mobile computer of claim 8, wherein the processor is further configured to perform operations such that syncing the output document to the document that is dependent on one or more of a computing platform and an operating system of a remote computing device, stored on one or more remote data stores comprises:
   sending the output document to the one or more remote data stores, causing the one or more remote data stores to update a stored version of the document that is dependent on one or more of a computing platform and an operating system of a remote computing device with the output document.

12. The mobile computer of claim 8, wherein the processor is further configured to perform operations comprising:
   sending a restart command to the print queue in response to producing an output document.

13. The mobile computer of claim 8, wherein the processor is further configured to perform operations comprising:
   sending a restart command to the print queue in response to determining that edits to the preview of the intermediate document are not received.

14. The mobile computer of claim 8, wherein the processor is further configured to perform operations comprising sending the intermediate document to the print queue in response to determining that edits to the preview of the intermediate document are not received.

15. A non-transitory computer readable storage medium having stored thereon processor-executable software instructions configured to cause a processor to perform operations for processing documents on a mobile computer, the operations comprising:

receiving, at the mobile computer, a message from a print queue indicating that a print job has been received;

sending a pause command to the print queue and a request for an intermediate document associated with the print job received by the print queue, in response to receiving the message;

receiving, at a mobile computer from the print queue, the intermediate document in a format that is independent of a computing platform or operating system, and wherein the intermediate document is based on an original document that is dependent on one or more of a computing platform and an operating system of a remote computing device;

displaying a preview of the intermediate document via a software application configured to accept edits to the intermediate document;

determining whether edits to the preview of the intermediate document are received, and in response to determining that edits are received:

updating the preview of the intermediate document with the edits to produce an output document in a format that is independent of a computing platform and operating system;

syncing the output document with the document that is dependent on one or more of a computing platform and an operating system of the remote computing device, stored on one or more remote data stores; and sending the output document to the print queue.

16. The non-transitory computer readable storage medium of claim 15, wherein the stored processor-executable software instructions are configured to cause a processor to perform operations further comprising receiving a status report comprising a result of printing the output document.

17. The non-transitory computer readable storage medium of claim 15, wherein the stored processor-executable software instructions are configured to cause a processor to perform operations such that syncing the output document to the document that is dependent on one or more of a computing platform and an operating system of a remote computing device, stored on one or more remote data stores comprises:

sending the output document to the one or more remote data stores, causing the one or more remote data stores to update a stored version of the document that is dependent on one or more of a computing platform and an operating system of a remote computing device with the output document.

18. The non-transitory computer readable storage medium of claim 15, wherein the stored processor-executable software instructions are configured to cause a processor to perform operations further comprising:

sending a restart command to the print queue in response to producing an output document.

19. The non-transitory computer readable storage medium of claim 15, wherein the stored processor-executable software instructions are configured to cause a processor to perform operations further comprising:

sending a restart command to the print queue in response to determining that edits to the preview of the intermediate document are not received.

20. The non-transitory computer readable storage medium of claim 15, wherein the stored processor-executable software instructions are configured to cause a processor to perform operations further comprising sending the intermediate document to the print queue in response to determining that edits to the preview of the intermediate document are not received.

* * * * *